United States Patent
Hendry et al.

(10) Patent No.: US 10,249,263 B2
(45) Date of Patent: Apr. 2, 2019

(54) RENDERING AND DISPLAYING HIGH DYNAMIC RANGE CONTENT

(71) Applicant: Apple Inc., Cupertino, CA (US)

(72) Inventors: Ian C. Hendry, San Jose, CA (US); Kenneth I. Greenebaum, San Carlos, CA (US); Eric L. Dacquay, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 15/173,425

(22) Filed: Jun. 3, 2016

(65) Prior Publication Data

US 2016/0358346 A1 Dec. 8, 2016

Related U.S. Application Data

(60) Provisional application No. 62/171,924, filed on Jun. 5, 2015.

(51) Int. Cl.
  *G06T 1/20* (2006.01)
  *G09G 5/02* (2006.01)
  (Continued)

(52) U.S. Cl.
  CPC ........... *G09G 5/10* (2013.01); *G06F 3/04847* (2013.01); *G06T 1/20* (2013.01); *G06T 11/001* (2013.01);
  (Continued)

(58) Field of Classification Search
  None
  See application file for complete search history.

(56) References Cited

U.S. PATENT DOCUMENTS

| 6,762,741 B2 | 7/2004 | Weindorf |
| 7,593,024 B2 | 9/2009 | Andrews et al. |

(Continued)

FOREIGN PATENT DOCUMENTS

| WO | 2007026283 | 3/2007 |
| WO | 2012177575 | 12/2012 |

(Continued)

OTHER PUBLICATIONS

U.S. Appl. No. 14/631,401, filed Feb. 25, 2015, Haitao Guo, et al.
(Continued)

*Primary Examiner* — Jason A Pringle-Parker
(74) *Attorney, Agent, or Firm* — Robert C. Kowert; Meyertons, Hood, Kivlin, Kowert & Goetzel, P.C.

(57) ABSTRACT

Methods and apparatus for rendering and displaying high dynamic range (HDR) digital image content. An HDR rendering and display system may support the rendering and display of standard dynamic range (SDR) and HDR content to both HDR-enabled and standard displays. The HDR rendering and display system renders digital image content into the HDR space and maps the rendered HDR content into the display space of HDR or standard displays using display processing techniques that may preserve at least some of the HDR content even for standard displays. The HDR rendering and display system may take into account various information including but not limited to display characteristics such as size, control inputs, current image characteristics such as image brightness, and environmental information such as viewer position and ambient lighting levels to dynamically adapt the rendering and display of the digital image content according to ambient viewing conditions at the target display.

20 Claims, 15 Drawing Sheets

(51) Int. Cl.
  *G06T 11/00* (2006.01)
  *G09G 5/10* (2006.01)
  *G06F 3/0484* (2013.01)
  *H04N 5/58* (2006.01)
  *H04N 1/60* (2006.01)
  *H04N 5/202* (2006.01)
  *H04N 19/46* (2014.01)
  *H04N 19/98* (2014.01)

(52) U.S. Cl.
  CPC .............. *G09G 5/02* (2013.01); *H04N 1/6061* (2013.01); *H04N 1/6088* (2013.01); *H04N 5/58* (2013.01); *G06T 2200/24* (2013.01); *G09G 2320/066* (2013.01); *G09G 2320/0626* (2013.01); *G09G 2340/06* (2013.01); *G09G 2354/00* (2013.01); *G09G 2360/144* (2013.01); *H04N 5/202* (2013.01); *H04N 19/46* (2014.11); *H04N 19/98* (2014.11)

(56) References Cited

U.S. PATENT DOCUMENTS

| | | | |
|---|---|---|---|
| 8,014,445 B2 | 9/2011 | Segall et al. | |
| 8,212,764 B2 | 7/2012 | Song et al. | |
| 8,330,768 B2 | 12/2012 | Mantiuk et al. | |
| 8,483,479 B2 | 7/2013 | Kunkel et al. | |
| 8,866,837 B2* | 10/2014 | Sun | G09G 3/3406 345/207 |
| 8,897,377 B2 | 11/2014 | Dougherty, III et al. | |
| 9,832,440 B2* | 11/2017 | Uchimura | G11B 20/10 |
| 10,089,936 B2* | 10/2018 | Han | G09G 3/3413 |
| 2005/0117799 A1 | 6/2005 | Fuh et al. | |
| 2008/0192819 A1* | 8/2008 | Ward | G06T 5/009 375/240.02 |
| 2008/0316372 A1 | 12/2008 | Xu et al. | |
| 2009/0027558 A1* | 1/2009 | Mantiuk | H04N 1/6027 348/673 |
| 2009/0146990 A1* | 6/2009 | Lin | G09G 3/3406 345/214 |
| 2011/0128438 A1 | 6/2011 | Yamashita et al. | |
| 2011/0194618 A1 | 8/2011 | Gish et al. | |
| 2012/0007965 A1 | 1/2012 | Mihara et al. | |
| 2013/0044122 A1 | 2/2013 | Ho et al. | |
| 2013/0235072 A1* | 9/2013 | Longhurst | H04N 1/46 345/605 |
| 2013/0328842 A1 | 12/2013 | Bamhoefer et al. | |
| 2014/0153820 A1* | 6/2014 | Lee | G06T 5/007 382/162 |
| 2014/0198137 A1 | 7/2014 | Feng et al. | |
| 2014/0210847 A1* | 7/2014 | Knibbeler | G09G 5/006 345/589 |
| 2014/0321561 A1 | 10/2014 | Stec et al. | |
| 2014/0340434 A1 | 11/2014 | El-Ghoroury et al. | |
| 2014/0341272 A1 | 11/2014 | Miller et al. | |
| 2015/0003749 A1* | 1/2015 | Kim | H04N 19/463 19/463 |
| 2015/0016735 A1 | 1/2015 | Kikuchi | |
| 2015/0201222 A1* | 7/2015 | Mertens | H04N 19/46 382/233 |

FOREIGN PATENT DOCUMENTS

| | | |
|---|---|---|
| WO | 2014128586 | 8/2014 |
| WO | 2014130343 | 8/2014 |
| WO | 2014135901 | 9/2014 |
| WO | 2015007505 | 1/2015 |
| WO | 2015073377 | 5/2015 |

OTHER PUBLICATIONS

U.S. Appl. No. 14/631,398, filed Feb. 25, 2015, Kenneth I. Greenebaum, et al.
U.S. Appl. No. 14/631,394, filed Feb. 25, 2015, Kenneth I. Greenebaum, et al.
U.S. Appl. No. 14/631,410, filed Feb. 25, 2015, Alexandros Tourapis, et al.
U.S. Appl. No. 14/631,405, filed Feb. 25, 2015, Hao Pan.
U.S. Appl. No. 15/173,428, filed Jun. 3, 2016, Kenneth I. Greenebaum, et al.
International Search Report and Written Opinion from PCT/US2016/035875, dated Aug. 26, 2016, Apple Inc., pp. 1-10.
Australian Examination Report from Application No. 2016270443, dated Jun. 5, 2015, Apple Inc., pp. 1-3.
Examination report from Australian Application No. 2016270443, dated Jun. 5, 2015, (Apple Inc.), pp. 1-4.
Preliminary Rejection from Korean Application No. 10-2017-7034499, dated Dec. 13, 2018, Apple Inc., pp. 1-13.
Tim Borer, "Non Linear Opto-Electrical Transfer Functions for High Dynamic Range Television", BBC White Paper 283, Jul. 2014, pp. 1-20.

* cited by examiner

HDR rendering and display system 100

HDR rendering and display system 200

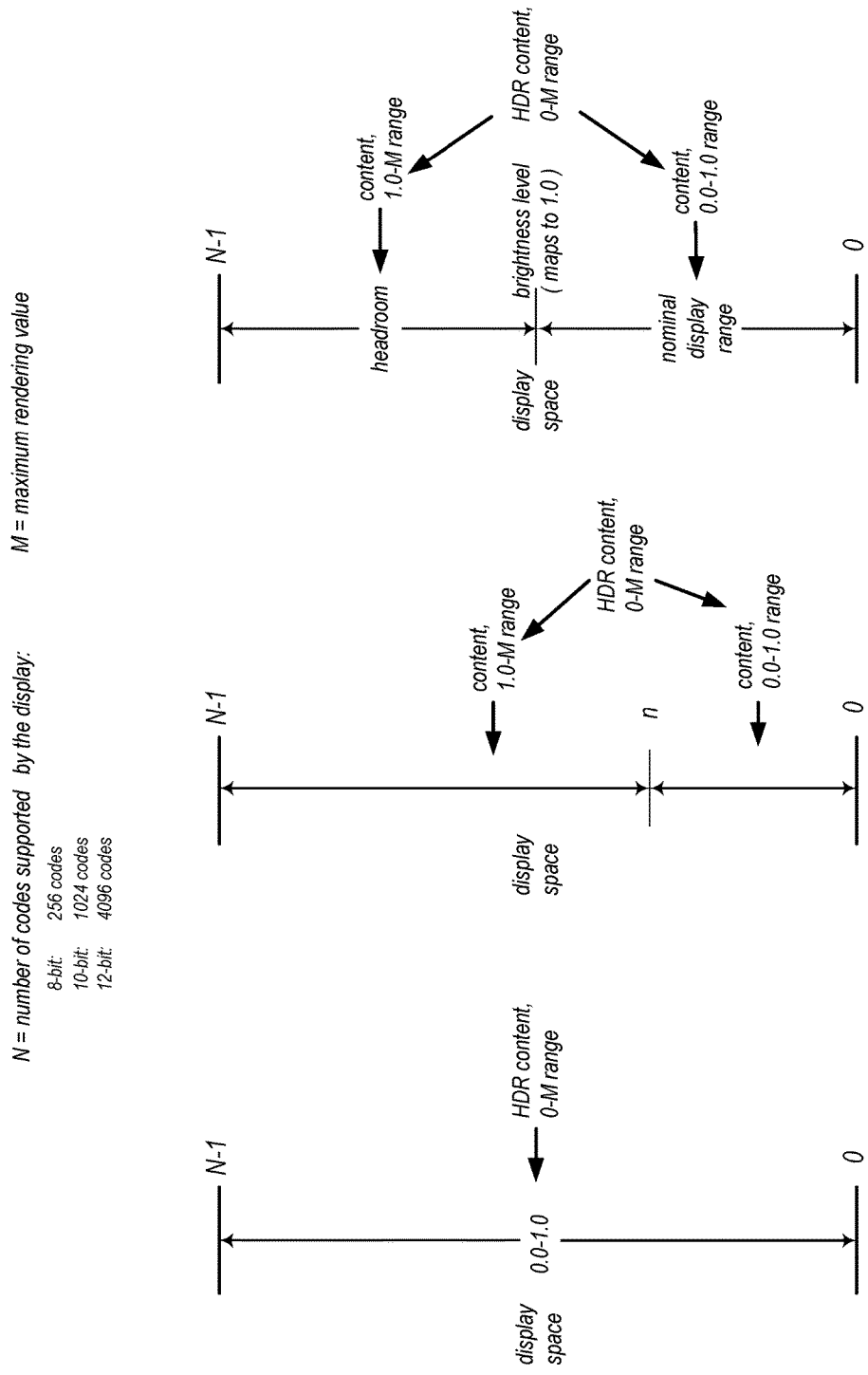

RENDERING AND DISPLAYING HIGH DYNAMIC RANGE CONTENT

PRIORITY INFORMATION

This application claims benefit of priority of U.S. Provisional Application Ser. No. 62/171,924 entitled "RENDERING AND DISPLAYING HIGH DYNAMIC RANGE CONTENT" filed Jun. 5, 2015, the content of which is incorporated by reference herein in its entirety.

BACKGROUND

Technical Field

This disclosure relates generally to digital video or image processing and display.

Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement video processing method(s). For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources according to one or more video processing methods and output the processed video frames to one or more destinations.

As an example, a video encoder may be implemented as an apparatus, or alternatively as a software program, in which digital video input is encoded or converted into another format according to a video encoding method, for example a compressed video format such as H.264/Advanced Video Coding (AVC) format, or H.265 High Efficiency Video Coding (HEVC) format. As another example, a video decoder may be implemented as an apparatus, or alternatively as a software program, in which video in a compressed video format such as AVC or HEVC is received and decoded or converted into another (decompressed) format according to a video decoding method, for example a display format used by a display device. The H.264/AVC standard is published by ITU-T in a document titled "ITU-T Recommendation H.264: Advanced video coding for generic audiovisual services". The H.265/HEVC standard is published by ITU-T in a document titled "ITU-T Recommendation H.265: High Efficiency Video Coding".

In many systems, an apparatus or software program may implement both a video encoder component and a video decoder component; such an apparatus or program is commonly referred to as a codec. Note that a codec may encode/decode both visual/image data and audio/sound data in a video stream.

In digital image and video processing, conventionally, digital images (e.g., video or still images) are captured, rendered, and displayed at a limited dynamic range, referred to as standard dynamic range (SDR) imaging. Extended or high dynamic range (HDR) imaging refers to technology and techniques that capture, represent, or reproduce a wider range of luminance in electronic images (e.g., as displayed on display screens or devices) than is obtained using standard digital imaging technology and techniques (referred to as standard dynamic range, or SDR, imaging). Many new devices such as image sensors and displays support HDR imaging. These devices may be referred to as HDR-enabled devices or HDR devices. At the same time, many display devices may not directly support HDR imaging; these devices may be referred to as standard displays or SDR displays. HDR media may also be directly synthesized, for example as in a ray trace, radiosity, or other rendering system that models light intensity. HDR media may also be created by mathematically combining a series of (potentially) SDR images each taken at a different exposure (exposure bracketing).

SUMMARY OF EMBODIMENTS

Various embodiments of methods and apparatus for rendering and displaying high dynamic range (HDR) digital image content are described. Embodiments of an HDR rendering and display system are described that may support the rendering and display of standard dynamic range (SDR) and HDR content to both HDR-enabled (HDR) and non-HDR enabled (standard, or SDR) displays. The HDR rendering and display system renders digital image content into the HDR space and maps the rendered HDR content into the display space of HDR or standard displays using display processing techniques that may preserve at least some of the HDR content even for standard displays. The HDR rendering and display system may take into account various information including but not limited to display characteristics, control inputs, brightness of the current image rendered on the display, size or dimensions of the display, distance of the viewer from the display, and environmental information such as ambient lighting levels to dynamically adapt the rendering and display of the digital image content according to ambient viewing conditions at the target display.

In embodiments of a method for rendering and displaying HDR content according to current display information, current display information may be determined or obtained. The current display information may include but is not limited to one or more of display characteristics (e.g., bit depth, resolution, size, etc.), carrying capacity/precision of components in the display pipeline, control inputs (e.g., brightness control or brightness slider input), and environmental information such as ambient lighting levels. One or more rendering pipelines may render and encode input content according to the current display information to generate encoded HDR content. In some embodiments, the current display information may be provided to the rendering pipeline(s) and used in rendering digital image content according to current conditions of the target display. For example, in some embodiments, the current display information may be provided to and used by the rendering pipeline(s) in determining a maximum rendering value M. The rendering pipeline(s) may then render and encode input content into the range 0.0-M to generate encoded HDR output.

In some embodiments, instead of or in addition to providing current display information to the rendering pipeline(s), current display information may be collected and used by a display management system that includes the display pipeline to determine a maximum rendering value M currently supported by the display pipeline, and the maximum rendering value M may be provided to one or more of the rendering pipelines. For example, detected ambient light levels and/or brightness control inputs may be used to determine a current brightness level B for the display according to ambient viewing conditions at the target display. The current brightness level B may be expressed as a percentage, and may correspond to the standard range (SDR) maximum brightness value (1.0). In some embodiments, the maximum rendering value M may be determined as the inverse of B. The rendering pipeline(s) may then render and encode input content into the range 0.0-M to generate encoded HDR output.

In some embodiments, when determining M, M may be optimized to be as large as possible while ensuring that precision, perceptual, and aesthetic thresholds are not exceeded. For example, at the viewer's current adaptation (especially in dark ambient conditions), it is important that the display's light leakage does not pass an objectionable perceptual threshold, and M may be optimized to be near, but below, this threshold. Further, given the precision of the display pipeline and the ability to carry more precision via techniques such as a dithering technique, it is important that the carrying capacity is sufficient such that no perceptual banding is induced in smooth gradients, and optimizing M helps to insure sufficient carrying capacity by limiting M to a value that is supported by the pipeline(s). As another example, if M is set too high, then the nominal display range, the lower portion of the display space into which the standard range (0.0-1.0) or SDR content is mapped, may be reduced to the point where different luminance levels are not distinguishable under current ambient conditions and the viewer's adaptation to those conditions because they are being mapped into too few perceptual bins. Thus, M may be optimized to be as large as possible while not exceeding a perceptual bin threshold for the display panel. In addition, in some embodiments, the black level may be adapted according to current ambient conditions such that the potentially compressed signal will be visible given the viewer's current adaptation. Further, a transfer function may be applied to map content to the model of the user's adapted vision and perceptual bins.

In some embodiments, a brightness control user interface element may be provided that allows the user to select a dimmer setting than what a conventional display brightness control, for example an LCD backlight controller, typically provides; conventional display brightness controls typically do not dim continuously all the way to black.

The rendering pipeline(s) may dynamically render input content into varying ranges as the current display information, and thus M, changes. Thus, the rendering of HDR content may be dynamically adapted according to current display conditions including but not limited to carrying capacity/precision of components in the display pipeline, control inputs (e.g., brightness control or brightness slider input), brightness of the current image on the display, and environmental information such as ambient lighting levels.

In at least some embodiments, the display pipeline obtains and decodes the encoded HDR content. The encoded HDR content may be received directly as a stream from a rendering pipeline, or may be read from a memory, for example from buffer(s) in a DMA memory. At the display pipeline, the encoded HDR content, rendered into the range 0.0-M by the rendering pipeline(s), may be decoded and mapped into the display space of the target display according to current display conditions including but not limited to a current brightness level and a nominal display range for the content determined according to ambient conditions and/or brightness control settings. In some embodiments, for at least some current display conditions, the display pipeline may map the standard (range 0.0-1.0) portion of the decoded HDR content to a nominal display range as determined according to the current brightness level, and map the extended (range 1.0-M) portion of the decoded HDR content to the headroom above the current brightness level.

Thus, embodiments of the HDR rendering and display system may dynamically render and display HDR content according to current display conditions including but not limited to display characteristics (e.g., bit depth, maximum luminance, leakage, reflectance, transfer function(s), etc.), carrying capacity/precision of components in the display pipeline, control inputs (e.g., brightness control or brightness slider input), and environmental information such as ambient lighting levels. Embodiments may preserve the appearance of the dynamic range of source content when viewed in adverse environments such as very high ambient light levels. Embodiments may also be applied to maintain SDR content in poor ambient conditions. Using embodiments, standard or SDR displays may produce HDR results when the HDR content is compressed and an appropriate dither applied, especially when viewed in a dim environment such that the user's perception is dark adapted. In addition, by dynamically adapting a display panel to different environments and ambient conditions, embodiments may use less backlight in some viewing environments, which for example may save power on mobile devices.

BRIEF DESCRIPTION OF THE DRAWINGS

FIG. 5A through 5C illustrate mapping HDR content to a display according to current display information, according to some embodiments.

Figure 1:
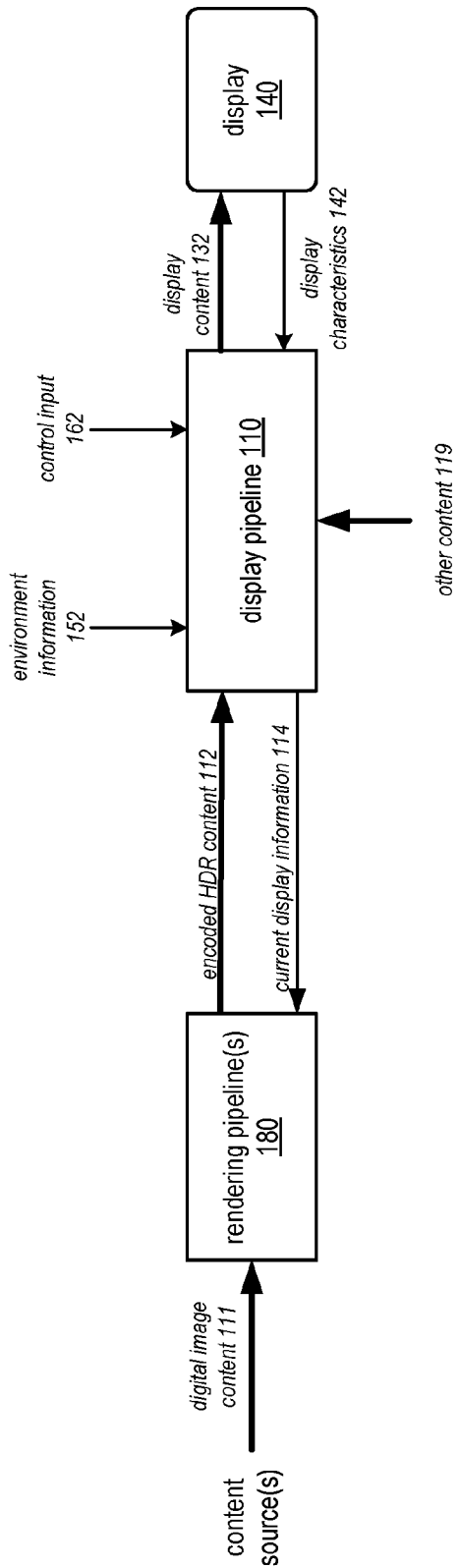
FIG. 1 illustrates high dynamic range (HDR) content rendering and display in an HDR rendering and display system, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION

Introduction

Various embodiments of methods and apparatus for rendering and displaying high dynamic range (HDR) digital image content are described. Embodiments of an HDR rendering and display system are described that may support the rendering and display of standard dynamic range (SDR) and HDR content to both HDR-enabled (HDR) and non-HDR enabled (standard) displays, as well as HDR displays of varying dynamic range (e.g., displays capable of greater brightness, displays capable of displaying darker blacks (i.e., less leakage and reflection), and displays with more precision (i.e., capable of displaying more levels of gray)). The HDR rendering and display system renders digital image content into HDR space and maps the rendered HDR content into the display space of HDR or standard displays using display processing techniques that may preserve at least some of the HDR content even for standard displays. The HDR rendering and display system may take into account various information including but not limited to display characteristics (e.g., bit depth, maximum luminance, leakage, reflectance, transfer function(s), etc.), carrying capacity/precision of components in the display pipeline, control inputs, brightness of the current image rendered on the display, size or dimensions of the display, distance of the viewer from the display, and environmental information such as ambient lighting levels to dynamically adapt the rendering and display of the digital image content according to the perceptual model's prediction of the viewer's adapted vision. Using embodiments, standard or SDR displays may produce HDR results when the HDR content is compressed and an appropriate dither applied, especially when viewed in a dim environment such that the user's perception is dark adapted.

In some embodiments, an HDR rendering and display system may employ methods that automatically adapt HDR content to a target display panel based on ambient environmental conditions, the display panel's characteristics and capabilities, display panel settings including user inputs via controls such as brightness controls, and other information such as precision of components in the display pipeline. In some embodiments, an HDR rendering and display system may dynamically adapt content for display in different ambient viewing environments, which may provide improved viewing in different environments and/or under different ambient conditions. Thus, embodiments of an HDR rendering and display system may provide an improved viewing experience for users of mobile or other devices by automatically adapting displayed content according to a model of the viewer's vision and perceptual range adapted to the environment in which the content is being viewed. By dynamically adapting a display panel to different environments and ambient conditions, embodiments of an HDR rendering and display system may use less backlight/brightness in some viewing environments, which for example may save power on mobile devices. In some embodiments, the displayed pixels and backlight/brightness can be mapped into a perceptual model, which may for example allow the HDR rendering and display system to make the display act more paper-like when adapting to different environments and ambient conditions. In other words, the HDR rendering and display system may be able to match the display to the luminance level of paper in the same environment, as well as track and adjust to or for the white point of the viewer's environment.

Embodiments of an HDR rendering and display system may dynamically adapt displayed content according to a model of the viewer's vision and perceptual range adapted to the environment in which the content is being viewed to provide more or less of the HDR viewing experience to the viewer across a wide range of displays, and for a wide variety of content. Unlike conventional systems in which HDR content is mapped into the entire display space of the display panel, embodiments may determine a lower portion or sub-range of the display space into which standard content is mapped, and an upper portion or sub-range of the display space into which HDR content is mapped (note that these sub-ranges of the display space may, but do not necessarily, cover the entire display space). Methods are described in which the sub-ranges and mapping of content into the ranges may be dynamically adapted according to the model of the viewer's vision and perceptual range and/or to the viewer's preferences to provide optimal or desired viewing experiences on a variety of displays in a variety of environments. For example, there may be a point at which the display cannot go any brighter, but a desired higher perceptual level of brightness may be achieved by tone mapping the low and midrange values (i.e., the standard content) into an extended range, while compressing the brights (e.g., the HDR content) into a narrower upper portion of the range. Thus, even though the display cannot go brighter, the low and midrange content can be boosted up to make it appear brighter perceptually so that it is not lost in the reflectance of the panel.

Embodiments of the HDR rendering and display system may be used to render and display HDR content as described herein to display panels that use backlights to provide brightness (e.g., LCD displays), as well as to display panels that do not use backlights to provide brightness (e.g., OLED displays in which each pixel emits light). Some functionalities of the HDR rendering and display system are described in relation to display panels that do use backlights to provide brightness. However, at least some of these functionalities may also be applied to display panels that do not use backlights to provide brightness. The term "brightness" when used herein in relation to display panels thus applies to brightness provided by backlights or by other technologies such as LED technology. Further, the term "backlight"

when used herein should be understood to also include other technologies such as LED technology that provide brightness.

HDR Rendering and Display System

FIG. 1 illustrates an HDR rendering and display system 100, according to at least some embodiments. Embodiments of the HDR rendering and display system 100 may support the rendering and display of SDR and HDR content to both HDR-enabled and standard displays 140. In some embodiments, the HDR rendering and display system 100 may include one or more rendering pipelines 180, a display pipeline 110, and a target display 140. In some embodiments, each rendering pipeline 180 may be associated with an application, device, module, component, or system that produces digital image content 111 for display. In some embodiments, a rendering pipeline 180 receives "raw" digital image content 111 from a source (e.g., a digital video camera or still image camera, or a video streaming source) and renders and encodes the received digital image content 111 to produce encoded content 112. Display pipeline 110 may receive encoded content 112 from one or more rendering pipelines 180, and may decode and process the received content 112 to generate display content 132 formatted for display to the display device 140. The HDR rendering and display system 100 may take into account various information including but not limited to display characteristics 142, control inputs 162, carrying capacity/precision of components in the display pipeline 110, and environmental information 152 such as ambient lighting levels to dynamically adapt the rendering and display of HDR content according to current conditions of the display 140. In some embodiments, display pipeline 110 may composite or blend other content 119 (e.g., user interface (UI) graphics) with the content 112 received from the rendering pipeline(s) 180.

Generally defined, dynamic range is the ratio between the largest and smallest possible values of a changeable quantity, such as in signals like sound and light. In digital image processing, a high dynamic range (HDR) image is an image that is produced using an HDR imaging technique that produces a wider range of luminosity than is obtained using standard digital imaging techniques. For example, an HDR image may include more bits per channel (e.g., 10, 12, 14, or more bits per luma and chroma channel), or more bits for luminosity (the luma channel), than are used in conventional image processing (typically, 8 bits per channel, e.g. 8 bits for color/chroma and for luma). (Bits per channel may be referred to as bit depth). An image produced using standard digital imaging techniques may be referred to as having a standard dynamic range (SDR), and typically uses 8 bits per channel. In addition, a high precision HDR image may be represented using fewer bits per channel than would otherwise be required, for example by dithering the higher precision signal before quantization, or by using a transfer function based on viewer visual perception that better matches viewer brightness perception across the HDR levels, for example the Perceptual Quantizer (PQ) transfer function proposed by Dolby Laboratories, Inc. Dynamic range is typically defined by maximum and minimum values. That means there are two ways to increase dynamic range: by lowering the minimum or increasing the maximum (or both). Precision alone can help lower the minimum, but the brightness of the highest code can instead or also be increased.

In conventional rendering and display systems, rendering pipelines map luminance (luma) pixel values of all digital content, whether SDR or HDR content, into a standard range (0.0-1.0) at a bit depth (e.g., 8, 10, or 12 bit) for encoding and output to a display pipeline. Each bit depth provides a certain number of codes into which the range is mapped. For example, 8 bits provide 256 codes (0-255), and 10 bits provide 1024 codes (0-1023). If the bit depth is 10, then 0.0 maps to 0, and 1.0 maps to 1023. A display pipeline obtains and decodes the output, and then maps the digital content values (range 0.0-1.0) into the display space (e.g., 8, 10, or 12 bits) of the display. Thus, 1.0 is the brightest value that is displayed, regardless of whether the original digital content was HDR or SDR content, and regardless of the characteristics (e.g., bit depth) of the display.

In embodiments of an HDR rendering and display system 100 as described herein, instead of mapping luma values for input content 111 into the standard range (0.0-1.0), rendering pipelines 180 may map the content 111 into wider ranges. For example, if the content 111 includes luma values that are brighter than normal or standard brightness (e.g., 10× standard brightness), then the rendering pipeline 180 may map the luminance data into the range 0.0-M, where M is the maximum value for brightness. Any of various mapping techniques may be used by the rendering pipeline 180. In some embodiments, a standard or SDR portion of the content 111 may be mapped into the range 0.0-1.0, and an extended or HDR portion of the content 111 may be mapped into the range 1.0-M. For example, for input content 111 that includes luminance values that are 10× standard brightness, then the values may be mapped into the range 0.0-10.0, with 1.0 representing standard brightness, and M=10.0 representing maximum brightness. At the display pipeline 110, the encoded HDR content 112 rendered into the range 0.0-M by the rendering pipeline(s) 180 may be decoded and mapped into the display space (e.g., 8, 10, or 12 bits) of a target display 140 using display pipeline processing methods as described herein. For example, standard range (0.0-1.0) or SDR content may be mapped into a lower portion of the display space (e.g., codes 0-127 for 8 bit), with the extended range (1.0-M) or HDR content mapped into the remainder of the display space (e.g., codes 128-255 for 8 bit). The lower portion of the display space into which the standard range (0.0-1.0) or SDR content is mapped may be referred to as the nominal display range.

In some embodiments, current display information may be collected and used by the rendering pipeline(s) 180 and/or display pipeline 110 in determining a maximum rendering value M. In some embodiments, when determining M, M may be optimized to be as large as possible while ensuring that precision, perceptual, and aesthetic thresholds are not exceeded. For example, at the viewer's current adaptation (especially in dark ambient conditions), it is important that the display's light leakage does not pass an objectionable perceptual threshold, and M may be optimized to be near, but below, this threshold. Further, given the precision of the rendering pipeline(s) 180 and the ability to carry more precision via techniques such as a dithering technique, it is important that the carrying capacity is sufficient such that no perceptual banding is induced in smooth gradients, and optimizing M helps to insure sufficient carrying capacity by limiting M to a value that is supported by the pipeline(s). As another example, if M is set too high, then the nominal display range, the lower portion of the display space into which the standard range (0.0-1.0) or SDR content is mapped, may be reduced to the point where different luminance levels are not distinguishable under current ambient conditions and the viewer's adaptation to those conditions because they are being mapped into too few perceptual bins. Thus, M may be optimized to be as large as possible while not exceeding a perceptual bin threshold for the display panel. In addition, in some embodiments, the black level may be adapted according to current ambient conditions such that the potentially compressed signal will be visible given the viewer's current adaptation. Further, a transfer function may be applied to map content to the model of the user's adapted vision and perceptual bins.

Figure 6:
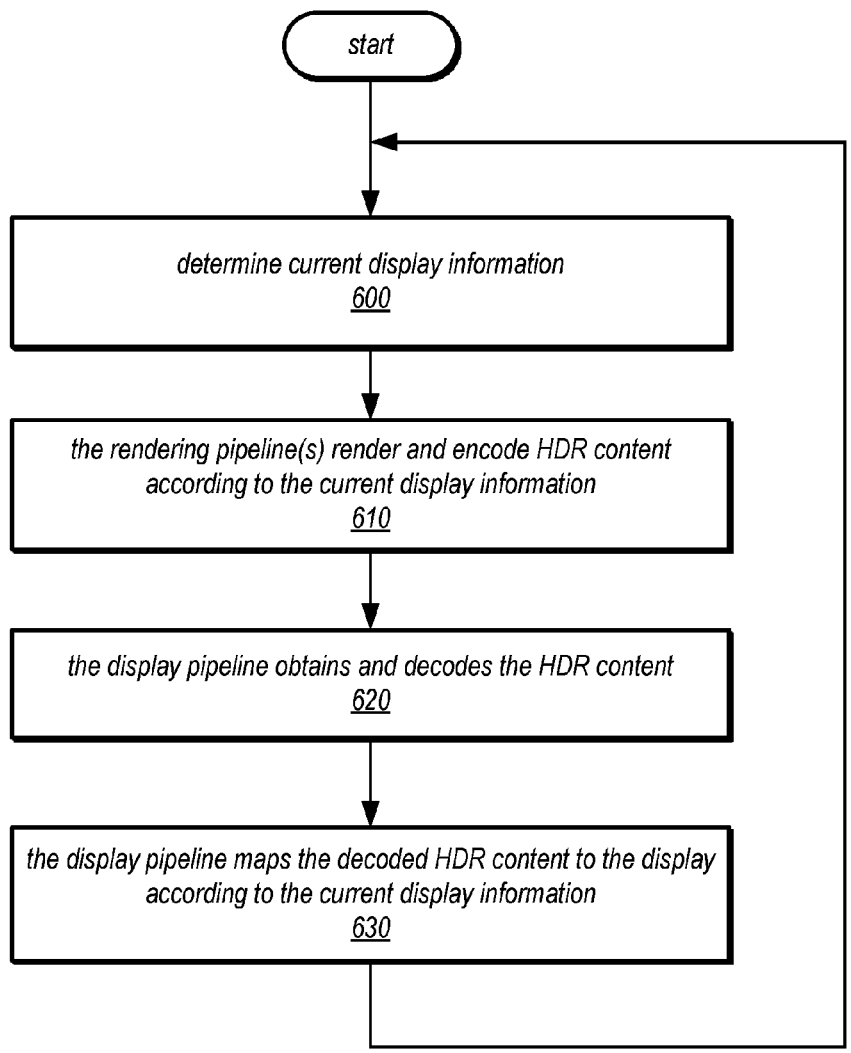
FIG. 6 is a high-level flowchart of a method for rendering and displaying HDR content according to current display information, according to some embodiments.

FIG. 6 is a high-level flowchart of a method for rendering and displaying HDR content according to current display information, according to some embodiments. As indicated at 600 of FIG. 6, current display information 114 may be determined or obtained. The current display information 114 may include one or more of display characteristics 142 (e.g., bit depth, resolution, size, maximum luminance, leakage, reflectance, transfer function(s), etc.), carrying capacity/precision of components in the display pipeline 110, control inputs 162 (e.g., brightness control or brightness slider input), and environmental information 152 such as ambient lighting levels. As indicated at 610 of FIG. 6, the rendering pipeline(s) 180 may render and encode input content 111 according to the current display information 114 to generate encoded HDR content 112. Referring to FIG. 1, in some embodiments, the current display information 114 may be provided to the rendering pipeline(s) 180 and used in rendering digital image content 111 according to current conditions of the target display 140. For example, in some embodiments, the current display information 114 may be provided to and used by the rendering pipeline(s) 180 in determining the maximum rendering value M The rendering pipeline(s) 180 may then render and encode input content 111 into the range 0.0-M to generate encoded HDR output 112.

In some embodiments, instead of or in addition to providing current display information 114 to the rendering pipeline(s) 180, current display information 114 may be collected and used by a display management system that includes the display pipeline 110 to determine a maximum rendering value M currently supported by the display pipeline 110, and the maximum rendering value M may be provided to one or more of the rendering pipelines 180. For example, detected ambient light levels and/or brightness control inputs may be used to determine a current brightness level B for the display 140 according to ambient viewing conditions at the target display. The current brightness level B may be expressed as a percentage (e.g., 0.25 or 25%, 0.5 or 50%), and may correspond to the standard range (SDR) maximum brightness value (1.0). In some embodiments, the maximum rendering value M may be determined as the inverse of B. For example, if B=0.25 (¼), then M=4/1=4.0. Similarly, if B=0.5, then M=2.0. In some embodiments, when determining M, M may be optimized to be as large as possible while ensuring that precision, perceptual, and aesthetic thresholds are not exceeded. The rendering pipeline(s) 180 may then render and encode input content 111 into the range 0.0-M to generate encoded HDR output 112.

As indicated at 620 of FIG. 6, the display pipeline 110 obtains and decodes the encoded HDR content 112. As indicated at 630 of FIG. 6, the display pipeline 110 then maps the decoded HDR content to the display 140 according to the current display information. At the display pipeline 110, the encoded HDR content 112, rendered into the range 0.0-M by the rendering pipeline 180, may be decoded and mapped into the display space of the target display 140. Note that the mapping may be, but is not necessarily, linear. For example, in a hypothetical (linear) case, if the target display 140 is an 8-bit display, B is currently set to 50%, and M=2.0, then standard range (0.0-1.0) or SDR content is mapped into the lower portion of the display space as indicated by B (codes 0-127), with the extended range (1.0-2.0) or HDR content mapped into the remainder of the display space (codes 128-255). In some embodiments, a panel backlight or brightness adjustment component of the pipeline 110 may adjust the backlight or brightness level for the target display panel at least in part according to the current brightness level B to adapt the display 140 to current environmental conditions including the ambient lighting level.

Embodiments of an HDR rendering and display system 100 as described herein may, for example, be implemented in devices or systems that include or are configured to be coupled to one or more image capture devices and/or one or more display devices. An image capture device may be any device that includes an optical sensor or photosensor that is capable of capturing digital images or video. Image capture devices may include, but are not limited to, video cameras and still image cameras, as well as image capture devices that can capture both video and single images. Image capture devices may be stand-alone devices or may be cameras that are integrated into other devices including but not limited to smartphones, cellphones, PDAs, tablet or pad devices, multifunction devices, computing devices, laptop computers, notebook computers, netbook computers, desktop computers, and so on. Note that image capture devices may include small form factor cameras suitable for use in small devices such as cellphones, PDAs, and tablet devices. FIGS. 8 through 12 show non-limiting examples of devices that may include or implement an HDR rendering and display system 100, image capture devices or cameras as described herein. Displays or display devices may include display screens or panels that are integrated into other devices including but not limited to smartphones, cellphones, PDAs, tablet or pad devices, multifunction devices, computing devices, laptop computers, notebook computers, netbook computers, desktop computers, and so on. Display devices may also include video monitors, projectors, or in general any device that can display or project digital images and/or digital video. The displays or display devices may use LCD (liquid crystal display) technology, LPD (light emitting polymer display) technology, or LED (light emitting diode) technology, although other display technologies may be used. The displays or display devices may include displays that use backlights to provide brightness (e.g., LCD displays), as well as displays that do not use backlights to provide brightness (e.g., OLED displays in which each pixel emits light).

Embodiments of the HDR rendering and display system 100 may support capture, processing, encoding, distribution, and display of HDR content, including but not limited to HDR video data, to HDR-enabled display devices and to display devices that do not support HDR imaging. In addition, embodiments may support display of standard dynamic range (SDR) content, including but not limited to SDR video data, to both HDR-enabled display devices and display devices that do not support HDR imaging. Embodiments of the HDR rendering and display system 100 may render and display video frames or sequences. Embodiments may also render and display single or still images instead of or in addition to video frames or sequences, as well as other digital images or digital content.

Figure 8:
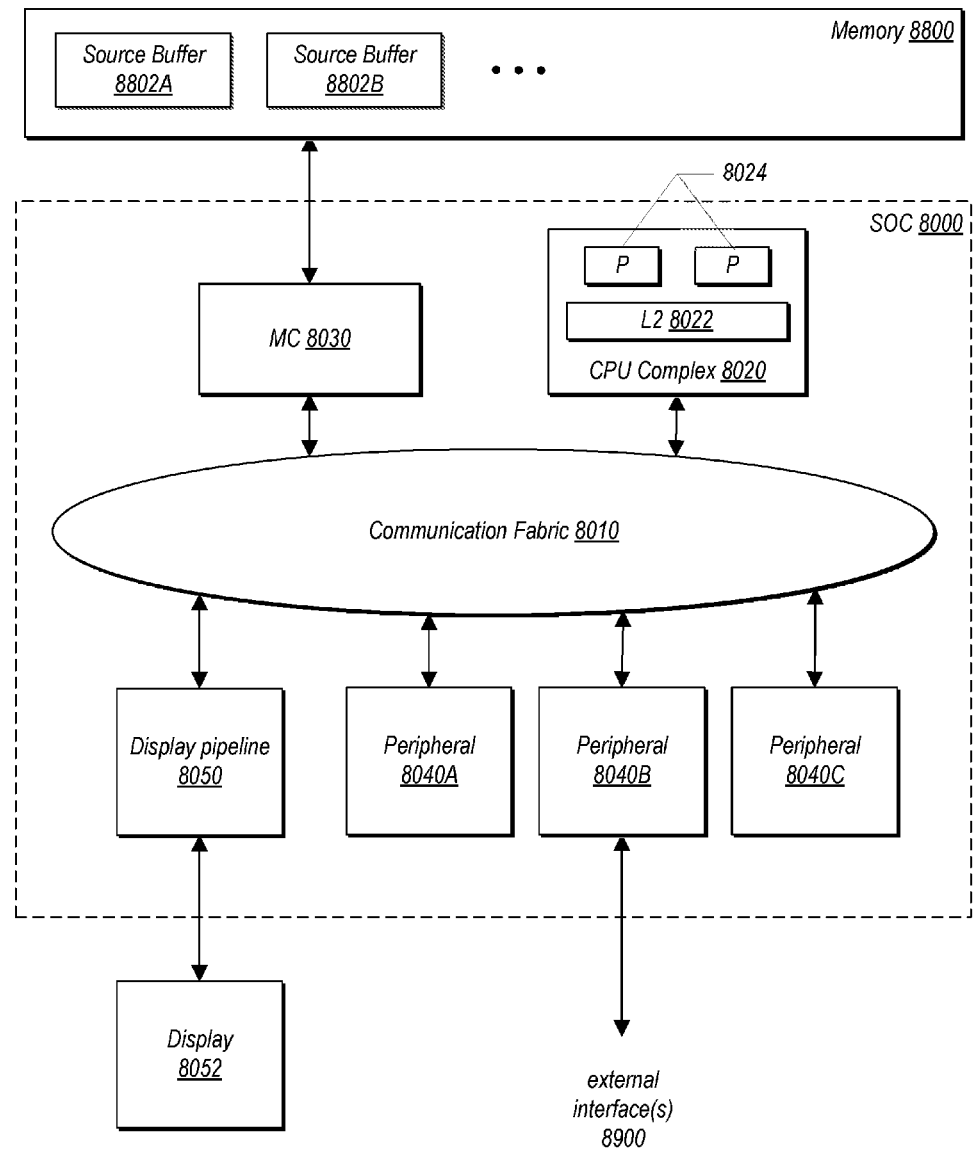
FIG. 8 is a block diagram of one embodiment of a system on a chip (SOC) that may be configured to implement aspects of the systems and methods described herein.
Figure 9:
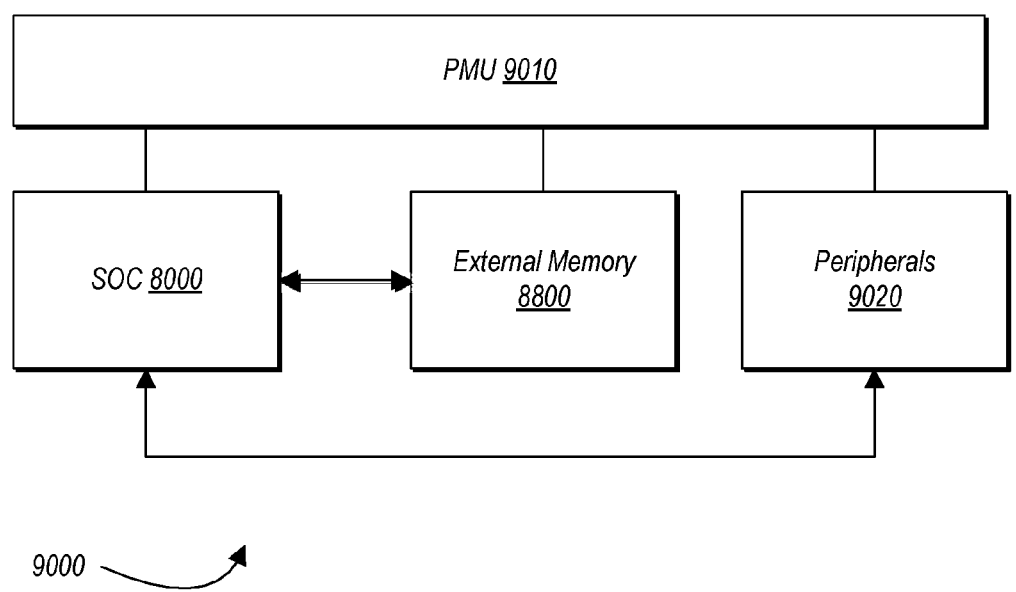
FIG. 9 is a block diagram of one embodiment of a system that may include one or more SOCs.
Figure 10:
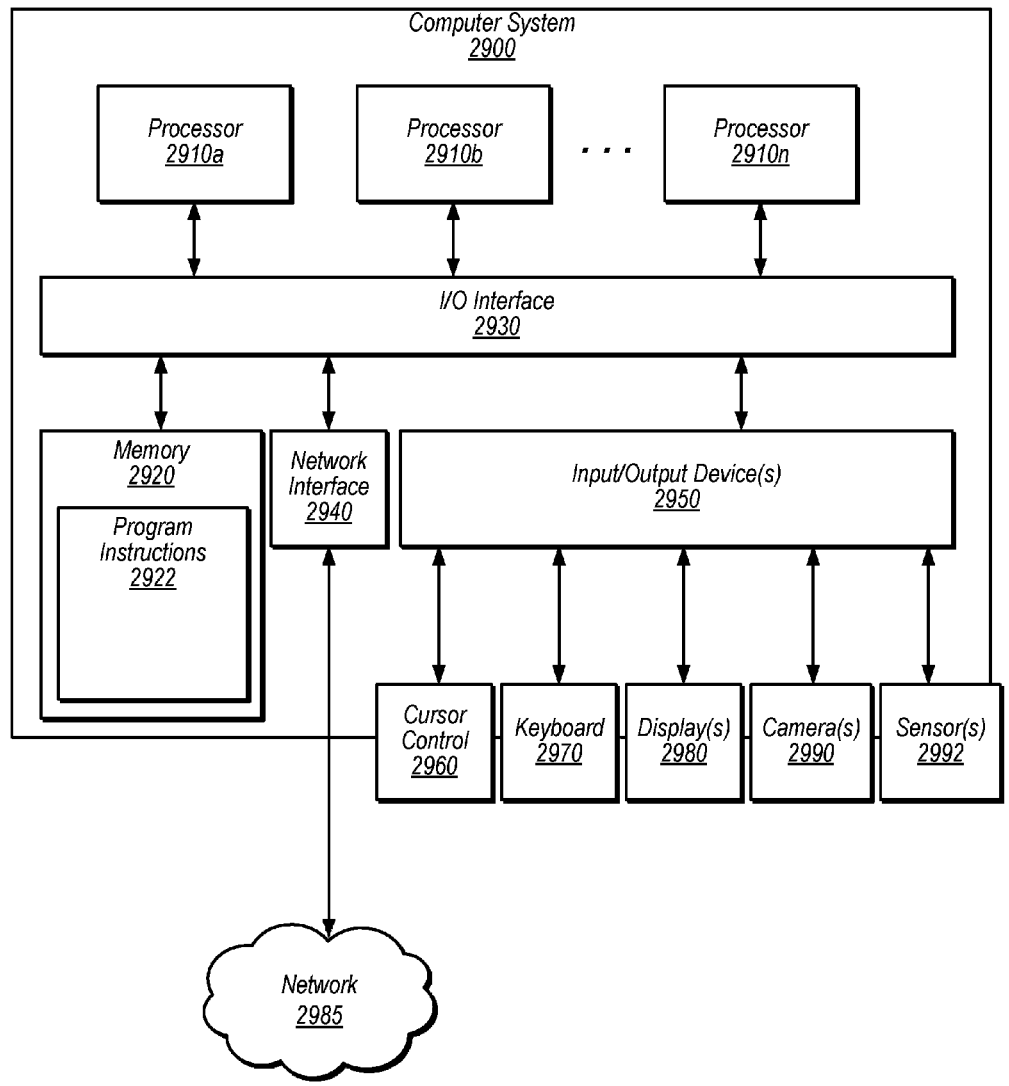
FIG. 10 illustrates an example computer system that may be configured to implement aspects of the systems and methods described herein, according to some embodiments.
Figure 11:
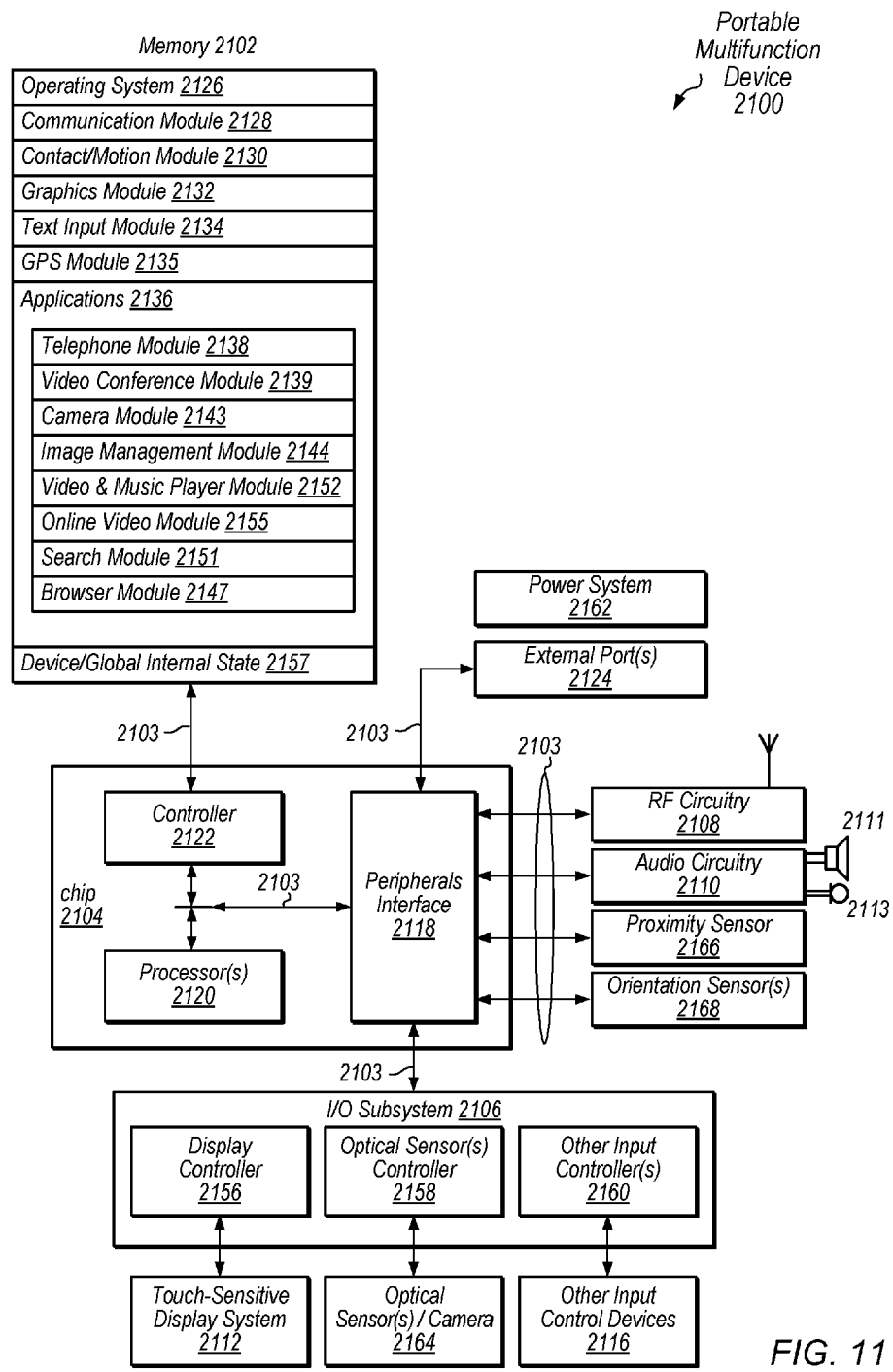
FIG. 11 illustrates a block diagram of a portable multifunction device in accordance with some embodiments.
Figure 12:
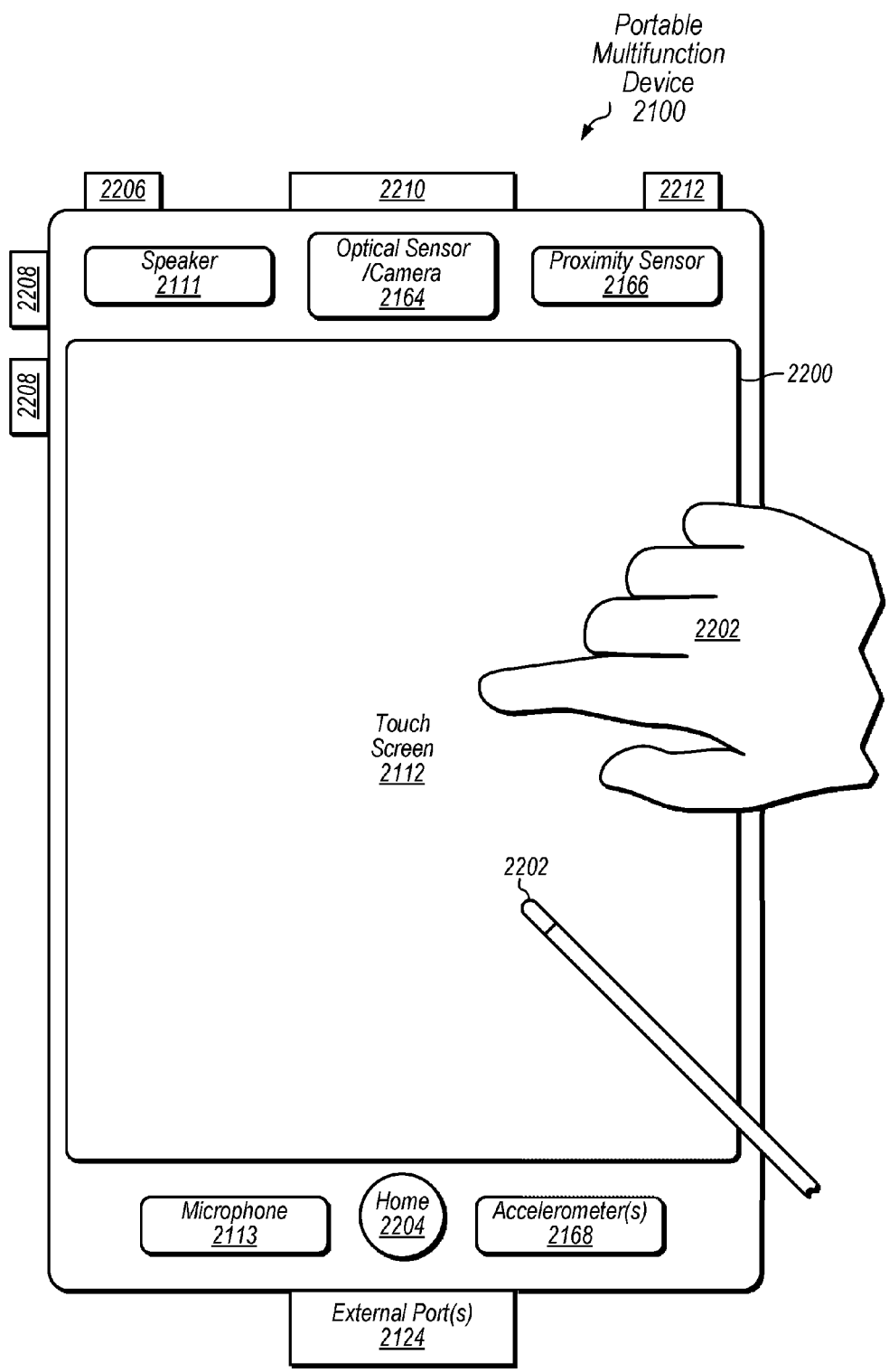
FIG. 12 depicts a portable multifunction device in accordance with some embodiments.

FIGS. 8 through 12 show non-limiting examples of devices in which embodiments of the HDR rendering and display system 100 may be implemented. A device or system that includes an image capture device and/or a display device may include hardware and/or software that implements at least some of the functionality for processing digital content including but not limited to video data as described herein. In some embodiments, a portion of the functionality as described herein may be implemented on one device, while another portion may be implemented on another device. For example, in some embodiments, a device that includes an image capture device may implement a rendering pipeline 180 that processes and compresses (i.e., encodes) images or video captured via a photosensor, while another device that includes a display panel or screen 140 may implement a display pipeline 110 that receives and processes the compressed images (i.e., decodes) for display to the display panel or screen 140. In some embodiments, at least some of the functionality as described herein may be implemented by one or more components or modules of a system on a chip (SOC) that may be used in devices including but not limited to multifunction devices, smartphones, pad or tablet devices, and other portable computing devices such as laptop, notebook, and netbook computers. For example, one or more display pipelines or display management systems may be implemented in or as modules (referred to as decoding modules) on an SOC, and a rendering pipeline may be implemented in or as modules (referred to as encoding modules) on an SOC. FIG. 8 illustrates an example SOC, and FIG. 9 illustrates an example device implementing an SOC. FIG. 10 illustrates an example computer system that may implement the methods and apparatus described herein. FIGS. 11 and 12 illustrate example multifunction devices that may implement the methods and apparatus described herein.

In some embodiments of an HDR rendering and display system 100 as described herein, a global tone mapping (GTM) technique may be used in converting or mapping content from one representation or range to another. In a GTM technique, a global tone curve may be specified or determined for one or more frames and used in converting content from one representation or range to another. In some embodiments, instead of or in addition to a GTM technique, a local tone mapping (LTM) technique may be used in converting content from one representation or range to another, for example to maintain contrast which otherwise may not be able to be represented. In an LTM technique, an image or frame is divided into multiple regions, with a tone curve specified or determined for each region. An LTM technique may help maintain contrast, for example when compressing past the otherwise achievable range of the display device. This may, for example, be the case when display brightness is competing with ambient brightness, for example when in direct sunlight.

Figure 2A:
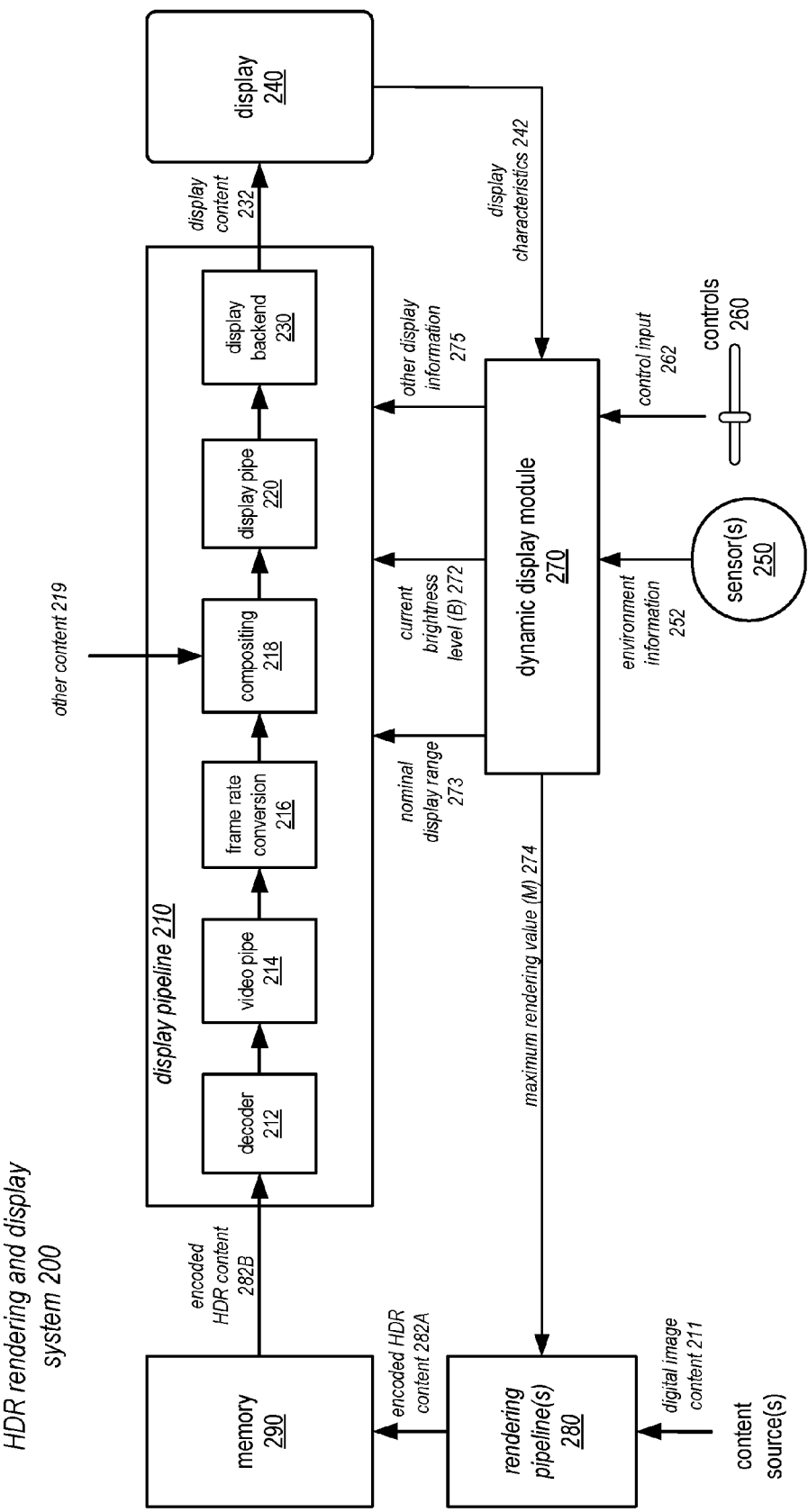
FIGS. 2A and 2B illustrate an example display pipeline in an HDR rendering and display system, according to some embodiments.
Figure 2B:
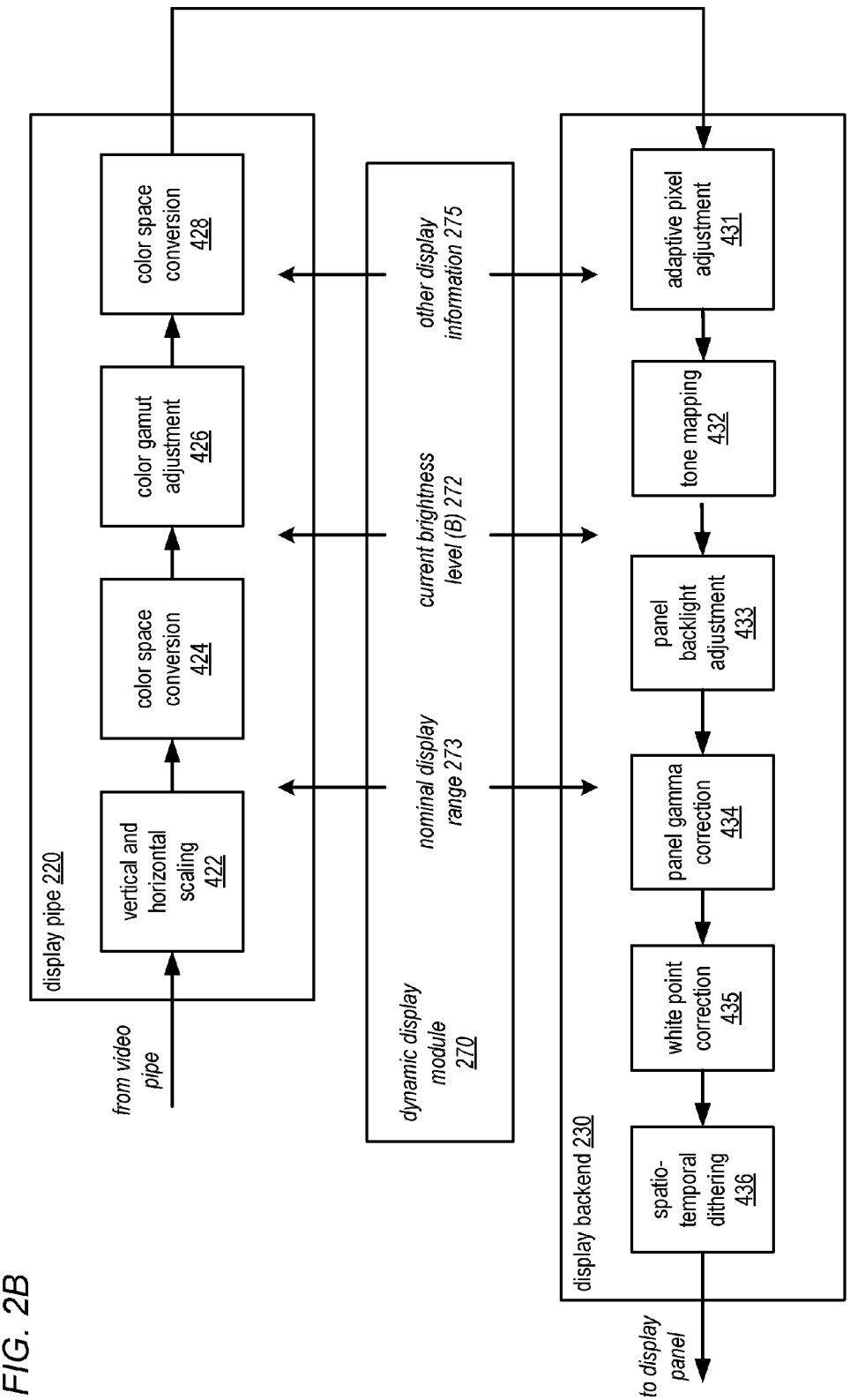
Figure 3:
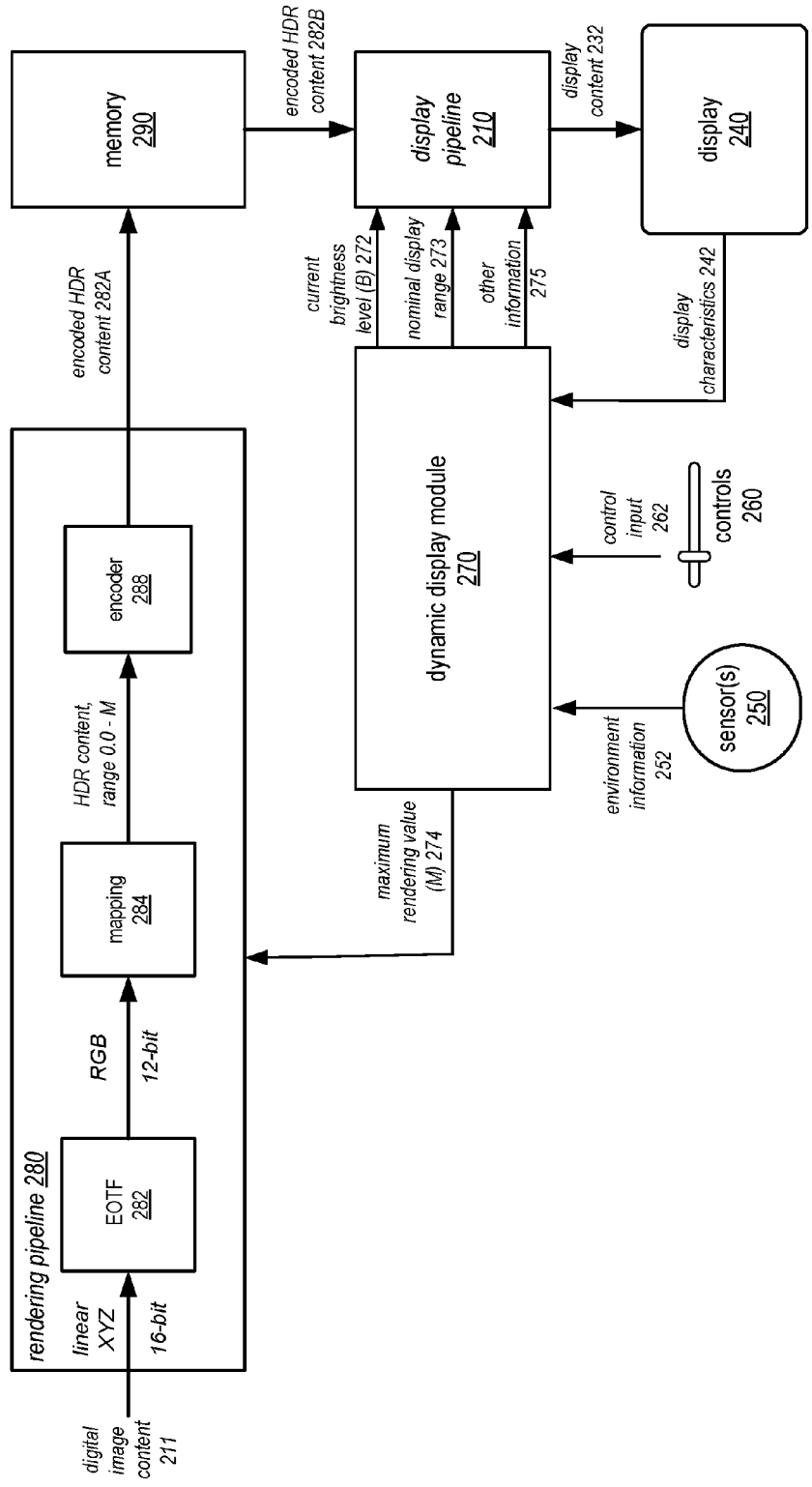
FIG. 3 illustrates an example rendering pipeline in an HDR rendering and display system, according to some embodiments.

FIGS. 2A, 2B, and 3 illustrate components and operations of embodiments of an HDR rendering and display system 100 in more detail. An HDR rendering and display system 200 may include, but is not limited to, one or more rendering pipelines 280, a display pipeline 210, and a dynamic display module 270. The components of an HDR rendering and display system 200 may be implemented in hardware, software, or as a combination thereof. FIGS. 2A and 2B illustrate details of an example display pipeline 210 in an HDR rendering and display system 200, according to some embodiments. FIG. 3 illustrates details of an example rendering pipeline 280 in an HDR rendering and display system 200, according to some embodiments. The display pipeline 210 may be implemented in a device or system that includes or is coupled to at least one display 240. The rendering pipeline 280 may, for example, be implemented in a device or system that includes or is coupled to at least one digital image content source such as still and/or video camera(s), or a video streaming source. The rendering pipeline 280 and display pipeline 210 may be implemented in the same device or system, or may be implemented in different devices or systems.

The display pipeline 210 may be implemented in a device that includes a target display 240 and that is located in an ambient environment. One or more viewers may be located in the ambient environment and may view content 232 output to the display 240. The system 200 may include or may implement one or more controls 260 for the display 240, for example brightness and contrast controls. The system 200 may also include or access one or more sensors 250 such as light sensors or cameras. The ambient environment may, for example, be a room (bedroom, den, etc.) in a house, an outdoor setting, an office or conference room in an office building, or in general any environment in which a system 200 with a display 240 may be present. The ambient environment may include one or more light sources such as lamps or ceiling lights, other artificial light sources, windows in indoor environments, and the sun or other light sources in outdoor environments. Note that a system 200 and/or display 240 may be moved or repositioned within an ambient environment, or moved from one ambient environment (e.g., a room) to another (e.g., another room or an outdoor environment).

FIGS. 2A, 2B, and 3 also illustrate a dynamic display module 270 as a component of the HDR rendering and display system 200. In some embodiments, dynamic display module 270 may be a component of a display management system that includes the display pipeline 210, or alternatively may be a component of the display pipeline 210. Dynamic display module 270 may collect various information including but not limited to display characteristics 242, carrying capacity/precision of components in the display pipeline 210, control inputs 262, and environmental information 252 such as ambient lighting levels, and may dynamically determine a nominal display range 273, current brightness level 272, and maximum rendering value 274 for the HDR rendering and display system 200.

As shown in FIGS. 2A and 3, in at least some embodiments, a rendering pipeline 280 may receive content 211 from a source (e.g., from a video camera on a device or system that includes the rendering pipeline 280, or from a video streaming source), render HDR content from the input content 211, and encode the rendered content into an encoded or compressed format according to an encoding method, for example a compressed video format such as H.264/Advanced Video Coding (AVC) format, or H.265 High Efficiency Video Coding (HEVC) format. The encoded HDR content 282A may be streamed to a display pipeline 210. Alternatively, the encoded content 282A may be streamed into a memory 290, for example into buffer(s) in a direct memory access (DMA) memory, for access by the display pipeline 210. The display pipeline 210 may obtain the encoded content 262B, decode the content 262B, and process the decoded content to generate display content 232 for display on the display panel 240.

FIG. 2A illustrates details of an example display pipeline 210 in an HDR rendering and display system 200, according to some embodiments. Display pipeline 210 may include, but is not limited to, a decoder 212 component or module, a video pipe 214 component or module, a frame rate conversion 216 component or module, a compositing 218 component or module, a display pipe 220 component or module, and a display backend 230 component or module. FIG. 2B illustrates an example display pipe 220 and display backend 230.

Referring to FIG. 2A, an encoded HDR video stream (e.g., an H.264/AVC or H.265/HEVC encoded video stream) may be received at a decoder 212 component of a display pipeline 210. The decoder 212 may decode/decompress the input content to generate HDR content that is fed to a video pipe 214. The video pipe 214 may perform various processing tasks or content processing techniques on the content including but not limited to noise/artifact reduction, scaling, sharpening, and color processing. In some embodiments, a frame rate conversion 216 component may convert the output of the video pipe 214 to a higher frame rate by generating intermediate frame(s) between existing frames. Converting to a higher frame rate may, for example, help to compensate for judder that may appear in HDR video, for example due to flicker being more evident at higher brightness levels. Output of the frame rate conversion 216 component may be fed into a display pipe 220 that may perform various processing tasks including but not limited to scaling, colors space conversion(s), color gamut adjustment, and local or global tone mapping. A display backend 230 may then perform additional processing tasks including but not limited to color (chroma) and tone (luma) adjustments, tone mapping, backlight or brightness adjustments, gamma correction, white point correction, black point correction, and spatio-temporal dithering to generate display content 232 output to a target display panel 240. In some embodiments, the display pipeline 210 may include a compositing 218 component that composites or blends other SDR or HDR digital information such as text or UI elements with the rendered HDR content. In some embodiments, the display pipeline 210 may convert the HDR content into a linear color space (e.g., a linear RGB or YCC color space) for compositing.

As shown in FIG. 2A, dynamic display module 270 may collect various display information including but not limited to display characteristics 242, carrying capacity/precision of components in the display pipeline 210, control inputs 262, and environmental information 252 such as ambient lighting levels, and may dynamically determine a nominal display range 273, current brightness level B 272, and maximum rendering value 274 for the HDR rendering and display system 200. The nominal display range 273 and current brightness level B 272 may be input to and used by one or more of the components or modules in the display pipeline 210 to dynamically adjust one or more of the video processing functions performed by the module(s) according to the information. Thus, one or more current conditions (e.g., ambient light, display characteristics, display settings, etc.) may be detected, analyzed, and used to dynamically adapt the rendering and display of the input HDR content 282B to the target display panel 240 in real- or near-real time.

In some embodiments, the display pipeline 210 receives the encoded HDR content 282B, with the luma component rendered into the range 0.0-M by the rendering pipeline 280, decodes the encoded content, and maps the decoded content into the display space of the target display 240, preserving the dynamic range 0.0-M of the luma content. Note that the mapping may be, but is not necessarily, linear. For example, in a hypothetical (linear) case, if the target display 240 is an 8-bit display, current brightness level B is 50%, and M=2.0, then standard range (0.0-1.0) or SDR content may be mapped or compressed into the lower portion of the display space as indicated by B (codes 0-127), with the extended range (1.0-2.0) or HDR content mapped into the remainder of the display space (codes 128-255). Thus, even on a standard display, rendered HDR content above the standard range (0.0-1.0) may be displayed.

FIG. 2B illustrates example display pipe 220 and display backend 230 components of a display pipeline 210, according to some embodiments. In some embodiments, display pipe 220 may perform vertical and horizontal scaling 422 to convert the HDR content to the target display panel resolution. Color space conversion 424 may then be performed to convert the scaled content from the color space of the input content (e.g., an RGB, YCC, or XYZ color space) to another color space (e.g., a YCC color space). Color gamut adjustment 426 may then be performed on the content to adjust the color (chroma) component of the video content to the color gamut of the target display panel. Another color space conversion 424 may then be performed to convert the video content to the color space of the display backend 230 (e.g., an RGB color space). The video content processed by the display pipe 220 may then be provided to the display backend 230.

In some embodiments, display backend 230 may perform additional, display panel-specific processing tasks on the content. In some embodiments of a display backend 230, an adaptive pixel adjustment 431 component may adjust pixel values in the content in response to information 275 including but not limited to environmental conditions such as ambient light level and display characteristics (e.g., bit depth, maximum luminance, leakage, reflectance, transfer function(s), etc.). In some embodiments of a display backend 230, a tone mapping 432 component may apply tone mapping to the content. Generally defined, tone mapping is a technique that maps one set of tonal image values (e.g., luma values from HDR image data) to another (e.g., to SDR image data). Tone mapping may be used, for example, to approximate the appearance of HDR images in a medium that has a more limited dynamic range (e.g., SDR). Tone mapping may generally be applied to the luma image data. In some embodiments of a display backend 230, a panel backlight (or brightness) adjustment 433 component may adjust backlight (or brightness) levels for the target display panel at least in part according to the current brightness level 272. In some embodiments of a display backend 230, panel gamma correction 434 may be performed to adjust brightness of the content for proper display on the target display panel. White point correction 435 may then be performed to correct the white point of the content to the white point of the target display panel. In some embodiments of a display backend 230, spatial (within a frame) and/or temporal (across two or more frames) dithering 436 may then be applied to the content to reduce or eliminate artifacts (e.g., banding patterns) in the displayed content.

As shown in FIG. 2B, a dynamic display module 270 may collect various information including but not limited to display characteristics 242, carrying capacity/precision of components in the display pipeline 210, control inputs 262, and environmental information 252 such as ambient lighting levels, and may dynamically determine a nominal display range 273, current brightness level 272, and other information 275 for the HDR rendering and display system 200. The nominal display range 273, current brightness level 272, and other information 275 may be input to and used by one or more of the components or modules in the display pipe 220 and/or display backend 230 of the display pipeline 210 to dynamically adjust one or more of the content processing functions performed by the module(s) according to the information. Thus, one or more current conditions (e.g., ambient light, display characteristics, display settings, etc.) may be detected, analyzed, and used to dynamically adapt the rendering and display of the HDR content 282 to a target display panel 240.

FIG. 3 illustrates details of an example rendering pipeline 280 in an HDR rendering and display system 200, according to some embodiments. Rendering pipeline 280 may be associated with an application, device, module, component, or system that produces digital image content 211 for display. In some embodiments, a rendering pipeline 280 receives "raw" digital image content 211 from a source (e.g., a digital video camera or still image camera, or a video streaming source) and renders and encodes the received digital image content 211 to produce encoded HDR content 282. Rendering pipeline 280 may include, but is not limited to, an electro-optical transfer function (EOTF) 282 component or module, a mapping 284 component or module, and an encoder 288 component or module.

The input content 211 to the rendering pipeline may 280, for example, be encoded in (linear) CIE 1931 XYZ color space at a bit depth of 16 bits. However, input content 211 may be in other formats, color spaces, and bit depths. An EOTF 282 component may apply an electro-optical transfer function (EOTF) operation to the input content 211 to map the input content 211 data to n-bit data in a color space, for example into a 12-bit RGB color space. A mapping 284 component may then map the content output by EOTF 282 (e.g., 12-bit RGB data) into a bit depth and color space (e.g., 10-bit RGB), for example using tone (luma) mapping and gamut (color) mapping techniques. However, any of various mapping techniques may be used by the mapping 284 component. In some embodiments, mapping 284 may be performed at least in part according to display information obtained from the display module 270 and/or display pipeline 210. In some embodiments of a rendering pipeline 280, a global tone mapping (GTM) technique may be used in mapping 284 component. In some embodiments, instead of or in addition to a GTM technique, a local tone mapping (LTM) technique may be used in mapping 284 component. In an LTM technique, an image or frame is divided into multiple regions, with a tone curve specified or determined for each region. An LTM technique may help maintain contrast, for example when compressing past the otherwise achievable range of the display device. This may, for example, be the case when display brightness is competing with ambient brightness, for example when in direct sunlight. In some embodiments, the output of EOTF 282 component may be converted into another color space, for example from an RGB to YCC color space, prior to mapping 284.

Instead of mapping luma values for the content 211 into a standard range (0.0-1.0) as is done in conventional rendering pipelines, the rendering pipeline 280 may map the content 211 into wider ranges. For example, if the input content 211 includes luma values that are brighter than normal or standard brightness (e.g., 10x standard brightness), then the rendering pipeline 280 may map the luminance data into the range 0.0-M, where M is the maximum value for brightness. Thus, the output of mapping 284 is HDR content, with luma mapped into the range 0.0-M. In some embodiments, a standard or SDR portion of the content 211 may be mapped into the range 0.0-1.0, and an extended or HDR portion of the content 211 may be mapped into the range 1.0-M. For example, for input content 211 that includes luminance values that are 10× standard brightness, then the values may be mapped into the range 0.0-10.0, with 1.0 representing standard brightness, and M=10.0 representing maximum brightness.

In some embodiments, current display information, including but not limited to display characteristics 242, carrying capacity/precision of components in the display pipeline 210, control inputs 262, and environmental information 252, may be collected and used by a dynamic display module 270 to determine a maximum rendering value M 274 currently supported by the display pipeline 210, and the maximum rendering value M 274 may be provided to the rendering pipeline 280. For example, detected ambient light levels and/or brightness control inputs may be used to determine a current brightness level B 272 for the display 240. The current brightness level B 272 may be expressed as a percentage (e.g., 0.25 or 25%, 0.5 or 50%, etc.), and may correspond to the standard range (SDR) maximum brightness value (1.0). In some embodiments, the maximum rendering value M 274 may be determined as the inverse of B. For example, if B=0.25 (¼), then M=4/1=4.0. Similarly, if B=0.5, then M=2.0. The rendering pipeline 280 may then map the luma component of the input content 211 into the range 0.0-M to generate the HDR content to be encoded.

An encoder 288 component may then encode the rendered content output into an encoded or compressed format according to an encoding method, for example a compressed video format such as H.264/Advanced Video Coding (AVC) format, or H.265 High Efficiency Video Coding (HEVC) format. In some embodiments, the output of mapping 284 component may be converted into another color space, for example from an RGB to YCC color space, prior to encoding 288. Output of the encode 288 is encoded HDR content 282A. The encoded HDR content 282A may be streamed to a display pipeline 210. Alternatively, the encoded content 282A may be streamed into a memory 290, for example into buffer(s) in a direct memory access (DMA) memory, for access by the display pipeline 210.

The display pipeline 210 may obtain the encoded content 262B, decode the content 262B, and process the decoded content to generate display content 232 for display on the display panel 240. In some embodiments, dynamic display module 270 may collect various information including but not limited to display characteristics 242, carrying capacity/precision of components in the display pipeline 210, control inputs 262, and environmental information 252 such as ambient lighting levels, and may dynamically determine a nominal display range 273, current brightness level 272, and other information 275 for the HDR rendering and display system 200. The nominal display range 273, current brightness level 272, and other information 275 may be input to and used by one or more of the components or modules in the display pipeline 210 to dynamically adjust one or more of the content processing functions performed by the module(s) according to the information. Thus, one or more current conditions (e.g., ambient light, display characteristics, display settings, etc.) may be detected, analyzed, and used to dynamically adapt the rendering and display of the HDR content 282 to a target display panel 240.

Note that the various video formats, color spaces, bit depths, and so on shown in FIGS. 2A, 2B, and 3 are given by way of example and are not intended to be limiting. For example, other color spaces than CIE 1931 XYZ may be used for input video. As another example, in some embodiments, encoding and decoding may be performed according to other encoding formats than the H.264/AVC or H.265/HEVC format. As another example, the color spaces used in the rendering pipeline 280 and the display pipeline 210, and the color space of the target display panel 240 into which the display pipeline 210 maps the content, may be any of a variety of color spaces, including but not limited to various YUV, YCC, RGB, Rec. 709, DCI P3, and Rec. 2020 color spaces.

Viewer Perception, Nominal Display Range, and Brightness

An important factor to consider in rendering and displaying HDR content is viewer perception. The human visual system has a wide lux range. At any given time, however, vision is only adapted to a small part of that range. At least some embodiments of an HDR rendering and display system as illustrated in FIGS. 1 through 3 may detect, track, and analyze conditions including but not limited to brightness of the current image rendered on the display, size or dimensions of the display, distance of the viewer from the display, and ambient environmental conditions including but not limited to ambient lighting to determine a current range for viewer vision according to the current conditions as well as how the conditions have changed in the recent past, and may adapt the rendering and display of content to a target display panel into that range according to the current conditions.

In photometry, the SI unit for luminance is candela per square meter ($cd/m^2$). Candela is the SI unit of luminous intensity. A non-SI term for the same unit is "NIT". The lux is the SI unit of illuminance and luminous emittance, measuring luminous flux (lumens) per unit area. The lux is equal to one lumen per square meter. The lumen is the SI derived unit of luminous flux, a measure of visible light emitted by a source.

Figure 4A:
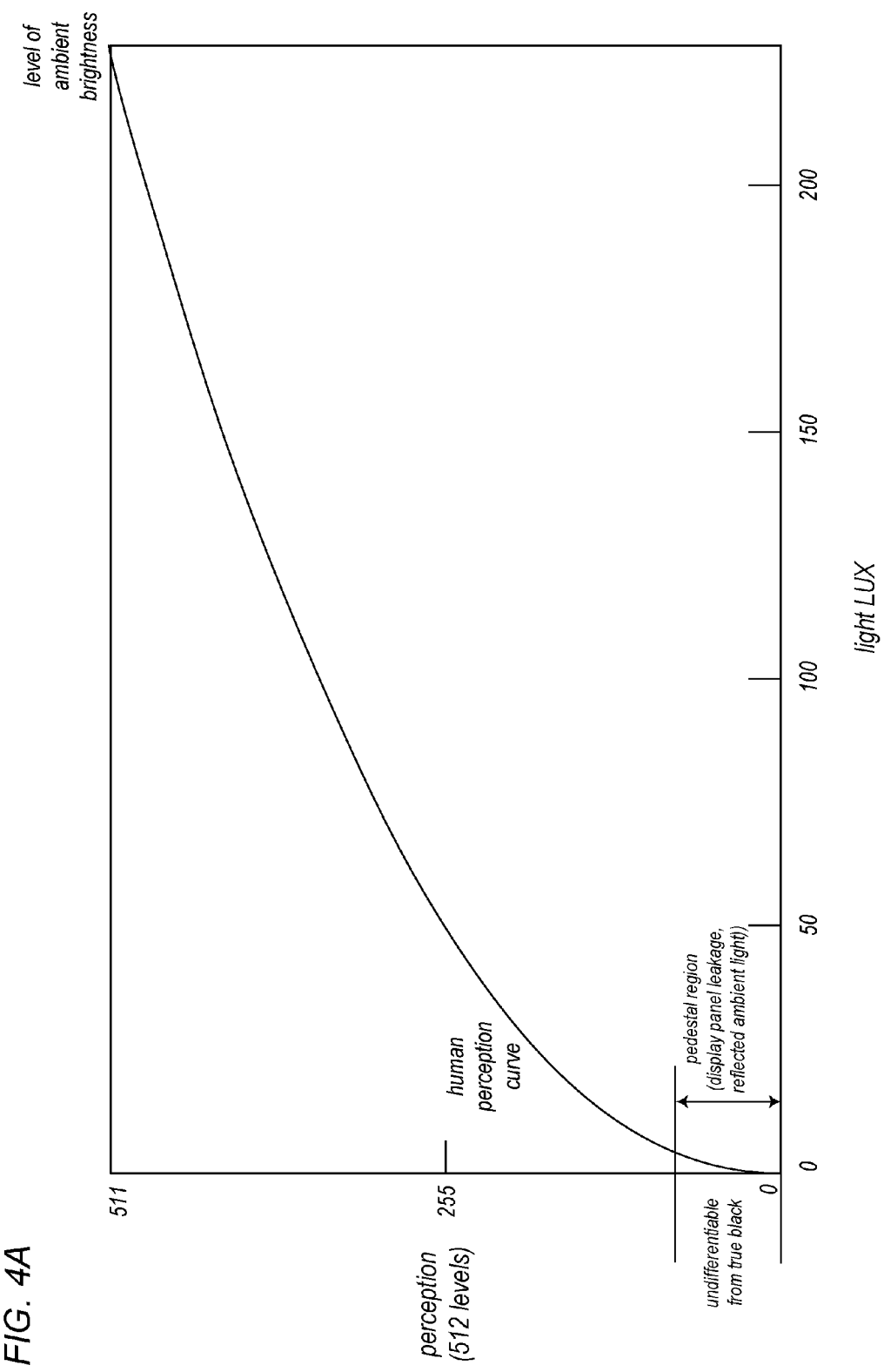
FIGS. 4A and 4B illustrate the human perceptual range with respect to an example display panel.
Figure 4B:
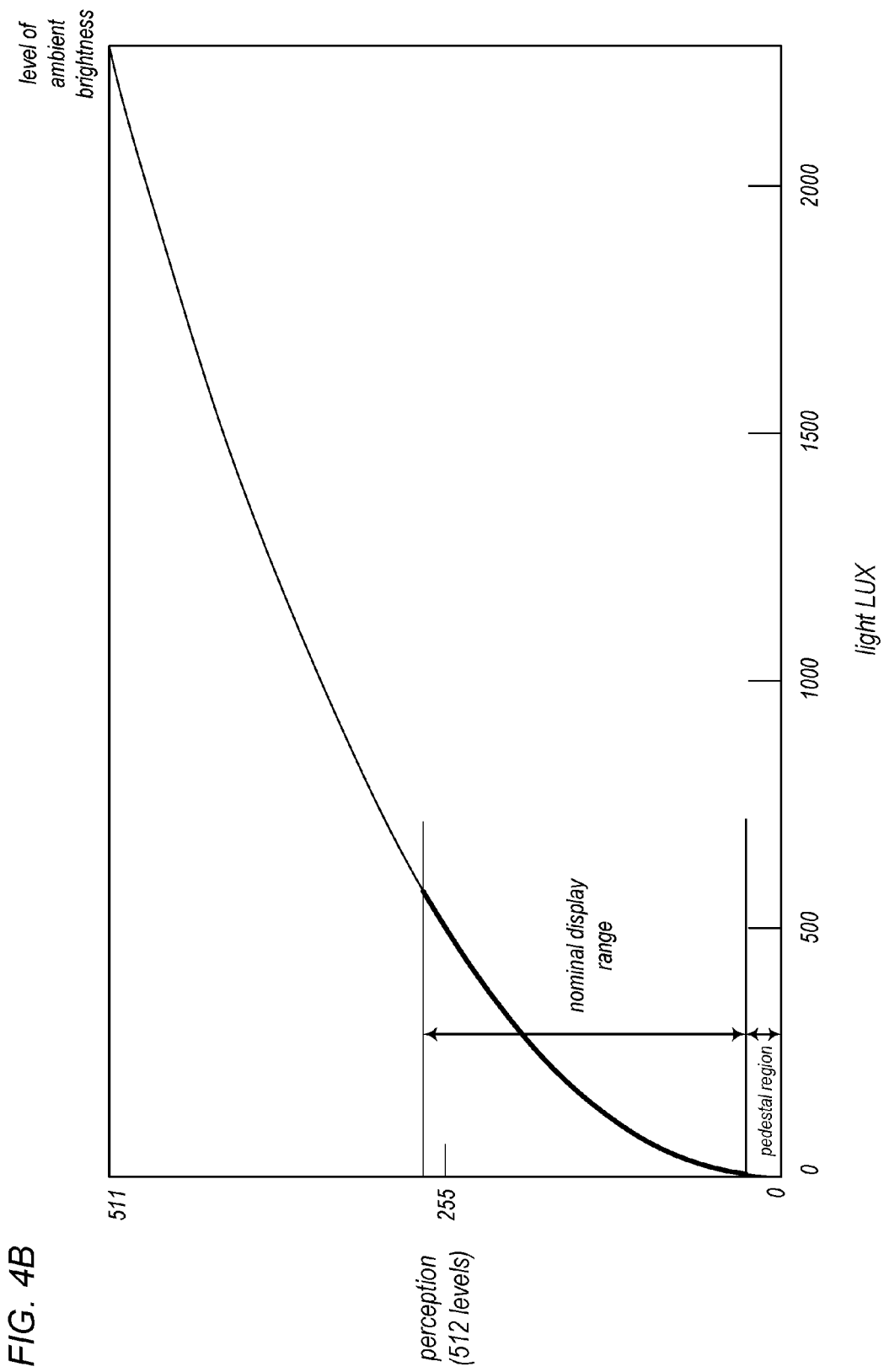

FIGS. 4A and 4B illustrate the human perceptual range with respect to an example display panel. FIG. 4A illustrates perceptual range for a display in a dim environment. FIG. 4B illustrates perceptual range for a display in a brighter environment. As illustrated by the curve in FIG. 4A, human perception is non-linear. However, human vision has a wide lux range, from starlight ($10^{-4}$ lux) to direct sunlight ($10^4$ lux). At any given time, human vision is only adapted to a small part of that range, and generally adapts to a brightest stimulus or object that subtends a significant percentage of the view. At any given adaptation level, there are only between $2^8$ and $2^9$ bins of intensity that may be distinguished between. In FIGS. 4A and 4B, the maximum lux level (about 250 in FIG. 4A, and 2500 in FIG. 4B) is the level of the ambient brightness, and correspondingly where the viewer's perception has been adapted. Similarly, at the dark end of the curve, the first perceptual bin (the lowest bin of the curve) is undifferentiable from true black.

FIG. 4A illustrates a fairly bright display in a fairly dim environment; the display mimics human vision fairly well. The vertical axis represents 512 perceptual levels (intensities). The pedestal region is a region that is difficult to render properly. The pedestal region includes shades of gray that cannot be reached with the display due to display leakage in black as well as reflected ambient light off the display panel, and illustrates how black on the display is perceptually differently from true black in terms of vision.

FIG. 4B shows a mapping of human perception into a brighter environment in which the display can only excite a portion of human perception. The portion of the curve indicated as the display range excites less than one half of the human visual range. The perceived response of the display is different from its measured response. Thus, there may be a limit in terms of the dynamic range that can be expressed on the display.

As previously noted, at a given adaptation level, there are only between $2^8$ and $2^9$ different levels of intensity that the human visual system can distinguish. Embodiments of an HDR rendering and display system as illustrated in FIGS. 1 through 3 may detect and analyze ambient environmental conditions including but not limited to ambient lighting to determine a current range for human vision according to the current conditions, referred to as a nominal display range, and may adapt the rendering and display of content to a target display panel into that nominal range according to the current conditions.

In embodiments of an HDR rendering and display system as illustrated in FIGS. 1 through 3, environmental information 252, including but not limited to ambient lighting, may be leveraged in processing the HDR content. If ambient lighting conditions are known, several things may be done that may enhance the viewer's experience. As shown in FIGS. 2A and 3, an HDR rendering and display system 200 may include one or more sensors 250 including but not limited to light sensors or cameras that may monitor environmental conditions for a display 240. This environmental information 252 may be leveraged by one or more of the modules in the HDR rendering and display system 200 to adapt the rendering and display of HDR content according to the ambient environment. For example, when tone mapping and/or gamut mapping is applied to the content for display, the mapping may be dynamically adjusted based at least in part on the current ambient lighting. As another example, the display brightness may be adjusted up or down based at least in part on the current ambient lighting. In some embodiments, in addition to ambient lighting, other environmental information 252 such as viewer position and angle may also be collected and used in adapting the rendering and display of HDR content according to the ambient environment.

In addition to environmental information 252 such as ambient lighting, in some embodiments a viewer may provide control input 262 via one or more controls 260 such as a display brightness slider that lets the viewer specify a desired brightness level. In some embodiments, a brightness control 260 may be provided that allows the user to select a dimmer setting than what a conventional display brightness control, for example an LCD backlight controller, typically provides; conventional display brightness controls typically do not dim continuously all the way to black. In some embodiments, the control input 262 may be used instead of or in addition to the environmental information 252 in adapting the rendering and display of HDR content for the viewer. In some embodiments, display characteristics 242 (e.g., bit depth, resolution, size/dimensions, leakage, reflectance, transfer function(s), etc.) may be obtained and used by the HDR rendering and display system 200 in adapting the rendering and display of HDR content for the viewer.

Referring to FIG. 2A, in some embodiments, an HDR rendering and display system 200 may include a dynamic display module 270 that may obtain or collect various information including but not limited to display characteristics 242, carrying capacity/precision of components in the display pipeline 210, control inputs 262, and environmental information 252, and may use the information dynamically determine a nominal display range 273, current brightness level 272, and maximum rendering value 274 for the HDR rendering and display system 200. The maximum rendering value 274 may be passed to one or more rendering pipelines 280 to be used as the maximum value M for luma values when rendering the input content 211 to generate HDR content to be encoded and output as encoded HDR content 282A. The nominal display range 273 and current brightness level 272 may be passed to the display pipeline 210 to be used when mapping the input HDR content 282B into the display space of the target display 240. In some embodiments the dynamic display module 270 may pass other information 275, including but not limited to environmental conditions such as ambient light level, to the display pipeline 210 for use when processing the HDR content for display.

FIGS. 5A through 5C illustrate mapping HDR content, rendered into the range 0.0-M by a rendering pipeline, to a display space using the current display information as generated by a dynamic display module, according to some embodiments. FIG. 5A illustrates mapping the HDR content to a normal or standard display (e.g., an 8-bit display) in a normal lighting environment. FIG. 5B illustrates mapping the HDR content to a bright or HDR-enabled display (e.g., a 10-, 12- or higher bit display). FIG. 5C illustrates mapping the HDR content to a normal or standard display (e.g., an 8-bit display) in a dim lighting environment. The portion of the display space into which the standard range (0.0-1.0) or SDR content is mapped may be referred to as the nominal display range.

FIG. 5A illustrates mapping the HDR content to a normal or standard display (e.g., an 8-bit display) in a normal lighting environment, according to some embodiments. For an 8-bit display, N=256. In the normal lighting environment, the nominal display range (0.0-1.0) may extend across all of the display's codes. In this example, for an 8-bit display, the codes are 0-255, and typically 0.0 maps to code 0, and 1.0 maps to code 255. The input HDR content, rendered into the range 0.0-M by the rendering pipeline(s), may be mapped by the display pipeline into the 256 codes of the display space. In some embodiments, the maximum value M may be mapped to 1.0/code 255, with 0.0 mapped to 0.0/code 0. Note that the mapping may be, but is not necessarily, linear. In some embodiments, a simple scale or multiplication function may be used to perform the mapping. In some embodiments, the mapping may be performed according to a gamma function, for example a gamma function determined according to a perceptual model as described herein. In some embodiments, one or more lookup tables (LUTs) may be used to perform the mapping. In some embodiments the LUTs may be adapted to correct for particular displays or types of displays, or to otherwise warp or adjust the mapping.

In some embodiments, standard range (0.0-1.0) or SDR content such as text or UI elements may be blended or composited with the rendered HDR content by the display pipeline prior to display. In some embodiments, when compositing or blending the SDR content with the HDR (0.0-M) content in the display space, the SDR content and standard (0.0-1.0) portion of the HDR content may be mapped or compressed into a lower portion of the display space (e.g., codes 0-127 for 8 bit), with the extended range (1.0-M) portion of the HDR content mapped into the remainder of the display space (e.g., codes 128-255 for 8 bit). Note that the mapping may be, but is not necessarily, linear. For example, in a hypothetical (linear) case, the SDR content and standard (0.0-1.0) portion of the HDR content may be mapped or compressed into codes 0-127 for 8 bit, if M=2, with the extended range (1.0-M) portion of the HDR content mapped into the remainder of the display space (codes 128-255 for 8 bit).

FIG. 5B illustrates mapping the HDR content to a bright or HDR-enabled display (e.g., a 10-, 12- or higher bit display), according to some embodiments. For a 10-bit display, N=1024. Thus, the codes are 0-1023. In some embodiments, the standard (0.0-1.0) portion of the HDR content may be mapped by the display pipeline into the lower codes (0-n) of the display space, with the extended range (1.0-M) portion of the HDR content mapped into the remainder of the display space (codes n-1023). Note that the mapping may be, but is not necessarily, linear. In some embodiments, n may be determined from the value of M. For example, in a hypothetical (linear) case, if M=4, for a 10 bit display, n=(1024/4)−1=255. More realistically, for a real-world non-linear (gamma) case, if M=4, for a 10-bit display with a gamma response of 2.2, 1.0 would be mapped to ((0.25)^2.2)*1023=48.45. Since display interfaces can only carry integers, this could be rounded to 48 or (more likely) 48.45 could be carried to the display with a dither.

In some embodiments, when compositing or blending SDR content with the HDR (0.0-M) content in the extended display space, the SDR content and standard (0.0-1.0) portion of the HDR content may be mapped or compressed into a lower portion of the display space (e.g., codes 0-n), with the extended range (1.0-M) portion of the HDR content mapped into the remainder of the display space (e.g., codes n-1023).

FIG. 5C illustrates mapping the HDR content to a normal or standard display (e.g., an 8-bit display) in a dim lighting environment, according to some embodiments. In a dim environment, even a normal display will appear very bright, and may appear uncomfortably bright to adapted viewer vision. Thus, brightness (e.g., backlight brightness) may be turned down using a control (e.g., a brightness slider UI element), or may be automatically dimmed in response to sensor input detecting ambient lighting. In some embodiments, the brightness control (e.g., brightness slider UI element) may allow the user to select a dimmer setting than what a conventional display brightness control, for example an LCD backlight controller, typically provides; conventional display brightness controls typically do not dim continuously all the way to black. Embodiments of the HDR rendering and display system may take advantage of the "headroom" or unused portion of the display space created by a dimmed brightness level of less than 100% to display HDR content to the standard display. For example, if display brightness is 50%, for an 8-bit display, the upper portion of the display codes (128-255) may be used for the extended or HDR portion of the content (luma values 1.0-M) as rendered by the rendering pipeline(s), with the lower portion (0-127) used for the standard or SDR portion of the content (luma values 0.0-1.0).

In some embodiments, the detected ambient light levels and/or brightness control input may be used to determine a current brightness level B for the display according to ambient viewing conditions at the target display. The current brightness level B may be expressed as a percentage (e.g., 0.25 or 25%, 0.5 or 50%, etc.). In some embodiments, B may correspond or map to the standard range (SDR) maximum brightness value (1.0). In some embodiments, the maximum rendering value M may be determined as the inverse of B. For example, if B=0.25 (¼), then M=4/1=4.0. Similarly, if B=0.5, then M=2.0. The rendering pipeline(s) may render HDR content into the range 0.0-M.

In some embodiments, current display information may be collected and used by the rendering pipeline(s) in determining the maximum rendering value M. In some embodiments, when determining M, M may be optimized to be as large as possible while ensuring that precision, perceptual, and aesthetic thresholds are not exceeded. For example, at the viewer's current adaptation (especially in dark ambient conditions as illustrated in FIG. 5C), it is important that the display's light leakage does not pass an objectionable perceptual threshold, and M may be optimized to be near, but below, this threshold. As another example, given the precision of the rendering pipeline(s) and the ability to carry more precision via techniques such as a dithering technique, it is important that the carrying capacity is sufficient such that no perceptual banding is induced in smooth gradients, and optimizing M helps to insure sufficient carrying capacity by limiting M to a value that is supported by the pipeline(s) without exceeding precision, perceptual, and aesthetic limits. As another example, if M is set too high, then the nominal display range, the lower portion of the display space into which the standard range (0.0-1.0) or SDR content is mapped, may be reduced to the point where different luminance levels are not distinguishable under current ambient conditions and the viewer's adaptation to those conditions because they are being mapped into too few perceptual bins. Thus, M may be optimized to be as large as possible while not exceeding a perceptual bin threshold for the display panel. In addition, in some embodiments, the black level may be adapted according to current ambient conditions such that the potentially compressed signal will be visible given the viewer's current adaptation. Further, a transfer function may be applied to map content to the model of the user's adapted vision and perceptual bins.

For an 8-bit display, N=256, and the codes are 0-255. In the dim lighting environment, the standard range (0.0-1.0) portion of the HDR content may be mapped or compressed by the display pipeline into the lower portion of the display space as determined by B. For example, in a hypothetical linear case, if B=0.5, then the standard range (0.0-1.0) may be mapped into codes 0-127 for an 8-bit display. The extended range (1.0-M) portion of the HDR content may be mapped into the remainder of the display space (codes 128-255 for an 8-bit display with B=0.5). Note that the mapping may be, but is not necessarily, linear. More realistically, for a real-world non-linear (gamma) case, if M=4, for a 10-bit display with a gamma response of 2.2, 1.0 would be mapped to $((0.25)^{2.2})*1023=48.45$. Since display interfaces can only carry integers, this could be rounded to 48 or (more likely) 48.45 could be carried to the display with a dither.

In some embodiments, when compositing or blending SDR content with the HDR (0.0-M) content in the standard display space, the standard range (0.0-1.0) portion of the HDR content may be mapped or compressed into the lower portion of the display space (e.g., codes 0-127 for an 8-bit display), with the extended range (1.0-M) portion of the HDR content mapped into the remainder of the display space (e.g., codes 128-255 for an 8-bit display). Note that the mapping may be, but is not necessarily, linear. For example, in a hypothetical (linear) case, the standard range (0.0-1.0) portion of the HDR content may be mapped or compressed into codes 0-127 for an 8-bit display with B=0.5, with the extended range (1.0-M) portion of the HDR content mapped into the remainder of the display space (codes 128-255 for an 8-bit display with B=0.5).

In some embodiments, the display panel backlight may be left at full power when mapping the HDR content to a normal or standard display in a dim lighting environment, as shown in FIG. 5C. The standard range (0.0-1.0) values are mapped or compressed into the lower portion of the display space (i.e., the nominal display range), with the extended range (1.0-M) portion of the HDR content mapped into the upper or "headroom" portion of the display space (the headroom is the upper region of the display space to which the values above 1.0 are mapped). Leaving the backlight at full power when displaying the HDR content in a dim environment, the standard content is displayed at a comfortable level for the viewer, while very bright effects such as explosions may be displayed in a way that is perceptually impressive when the viewer's perception is dim adapted. However, leaving the backlight at full power is a significant source of power consumption. In some embodiments, to reduce power consumption, the backlight power is modulated based upon the content being displayed. The backlight may be dimmed when there is no content in the upper (1.0-M) range, and turned up when there is bright content. The pixel values may be adjusted by the display pipeline according to the backlight setting to maintain the same apparent brightness. When the backlight is up, the pixels are reduced; when the backlight is down pixels are made logically brighter. Thus, darker pixels may be stretched to be brighter, but brighter pixels may be compressed, and thus details in bright content may be lost. Thus, this method may degrade visual effects in some situations, for example when blending typically brighter SDR content such as UI elements with typically darker HDR content such as movies or videos.

In some embodiments, since the SDR content such as UI elements and the HDR content are separately processed, with the SDR content mapped into the lower portion of the display space, when adjusting the pixel values according to the backlight setting the SDR content may be preserved and thus not compressed, with the adjustment only applied to the HDR content. Thus, brightness details in the SDR content such as the UI elements may be preserved.

FIGS. 7A through 7D are a flowchart of a method for rendering and displaying HDR content to a standard display, according to some embodiments. The method of FIGS. 7A through 7D may, for example, be implemented by an HDR rendering and display system as illustrated in FIGS. 1 through 3.

Figure 7A:
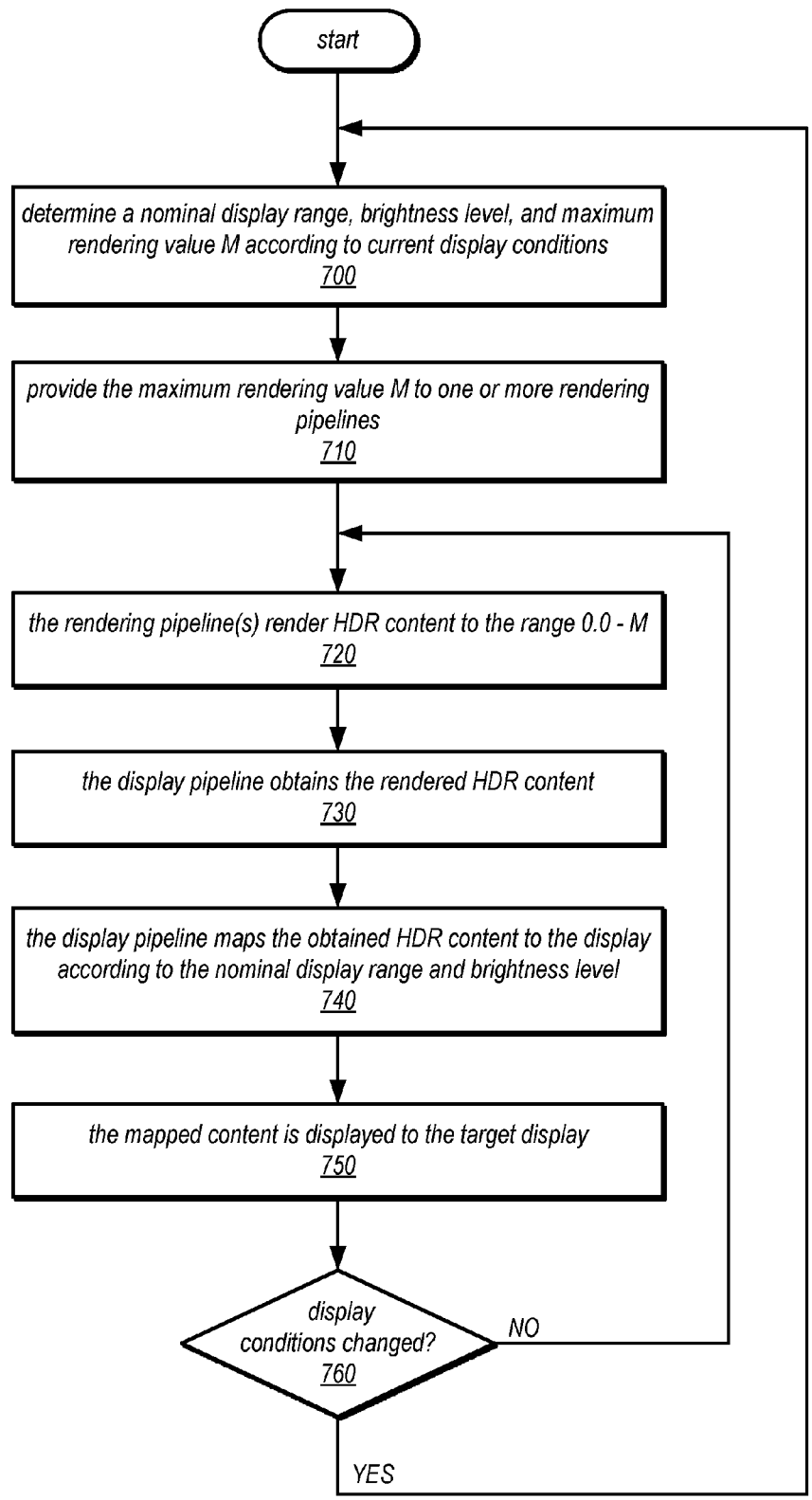
FIGS. 7A through 7D are a flowchart of a method for rendering and displaying HDR content to a standard display, according to some embodiments.
Figure 7B:
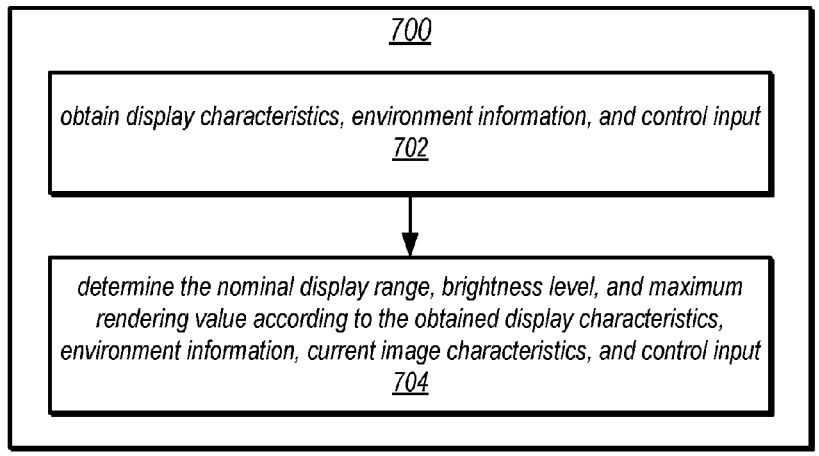

FIG. 7A shows a method for rendering and displaying HDR content to a standard display, according to some embodiments. As indicated at 700 of FIG. 7A, a nominal display range, brightness level B, and maximum rendering value M may be determined according to current display conditions. In some embodiments, the nominal display range, brightness level B, and maximum rendering value M may be determined by a dynamic display module of an HDR rendering and display system as illustrated in FIGS. 2A, 2B, and 3. In some embodiments, current display information may be collected and used in determining the maximum rendering value M. In some embodiments, when determining M, M may be optimized to be as large as possible while ensuring that precision, perceptual, and aesthetic thresholds are not exceeded. In addition, in some embodiments, the black level may be adapted according to current ambient conditions such that the potentially compressed signal will be visible given the viewer's current adaptation. FIG. 7B shows element 700 of FIG. 7A in more detail, according to some embodiments.

Figure 7C:
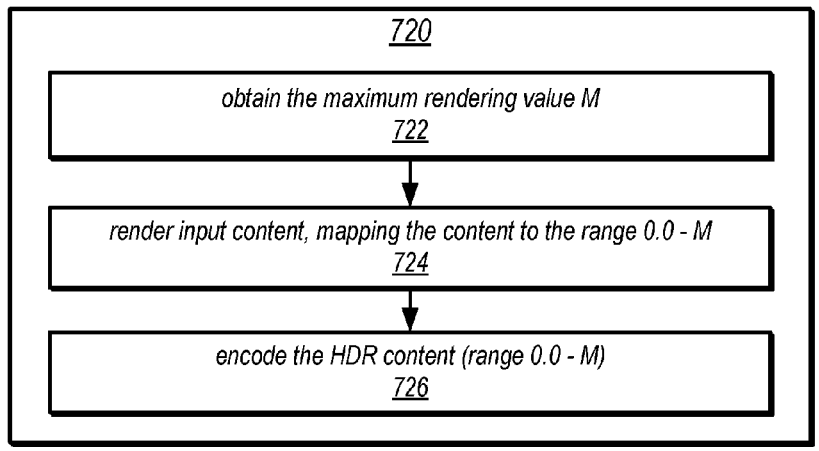

As indicated at 710 of FIG. 7A, the maximum rendering value M may be provided to one or more rendering pipelines. As indicated at 720 of FIG. 7A, the rendering pipeline(s) may render HDR content to the range 0.0-M. FIG. 3 illustrates details of an example rendering pipeline in an HDR rendering and display system, according to some embodiments. FIG. 7C shows element 720 of FIG. 7A in more detail, according to some embodiments.

Figure 7D:
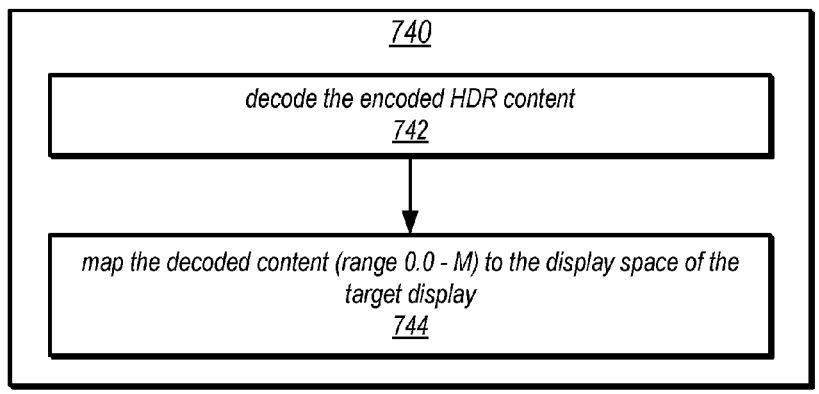

As indicated at 730 of FIG. 7A, the display pipeline may obtain the rendered HDR content. As indicated at 740 of FIG. 7A, the display pipeline may map the obtained HDR content to the display according to the nominal display range and brightness level. FIGS. 2A and 2B illustrate details of an example display pipeline in an HDR rendering and display system, according to some embodiments. FIG. 7D shows element 740 of FIG. 7A in more detail, according to some embodiments.

As indicated at 750 of FIG. 7A, the mapped content may be displayed to the target display. In some embodiments, the display pipeline may composite or blend other SDR or HDR digital information such as text or UI elements with the rendered HDR content. In some embodiments, standard range (0.0-1.0) or SDR content such as text or UI elements may be blended or composited with the rendered HDR content by the display pipeline prior to display. In some embodiments, when compositing or blending the SDR content with the HDR (0.0-M) content in the display space, the SDR content and standard (0.0-1.0) portion of the HDR content may be mapped or compressed into a lower portion of the display space (e.g., codes 0-127 for 8 bit, if M=2), with the extended range (1.0-M) portion of the HDR content mapped into the remainder of the display space (e.g., codes 128-255 for 8 bit). Note that the mapping may be, but is not necessarily, linear.

At 760 of FIG. 7A, if the display conditions have changed, then the method may return to element 700 to determine new values for the nominal display range, brightness level B, and maximum rendering value M according to the changed display conditions. As non-limiting examples of changes in display conditions, the viewer may adjust a brightness control to change the brightness level, or a change in ambient lighting conditions may be detected by a sensor. Other factors that may affect the display are features such as compensation for white point shifts (including temperature and calibration compensation), brightness limits related to dynamic panel limits such as current or thermal limits, or system configuration changes such as switching to battery power or similar power-constrained modes. Otherwise, the method may return to element 720 to continue rendering and displaying HDR content according to the current values for the nominal display range, brightness level B, and maximum rendering value M.

FIG. 7B shows element 700 of FIG. 7A in more detail, according to some embodiments. The method of FIG. 7B may, for example, be performed by a dynamic display module as illustrated in FIGS. 2A, 2B, and 3. As indicated at 702 of FIG. 7B, display characteristics, environment information, and control input may be obtained. For example, in some embodiments, a dynamic display module as illustrated in FIGS. 2A, 2B, and 3 may obtain display characteristics (e.g., bit depth, resolution, dimensions, maximum luminance, leakage, reflectance, transfer function(s), etc.) from the target display, environment information such as ambient light level from one or more sensors and distance of the viewer from the display, current image characteristics such as image brightness, and control input from one or more controls such as brightness slider bars.

As indicated at 704 of FIG. 7B, the nominal display range, brightness level B, and maximum rendering value M may be determined according to the obtained display characteristics, environment information, current image characteristics, and control input. For example, in some embodiments, the brightness level B may be determined as a function of a detected ambient light level. Alternatively, the brightness level B may be determined from control input to a brightness control UI element. In some embodiments, the brightness level B may be determined as a function of the ambient light level and the control input to a brightness control UI element. In some embodiments, the maximum rendering value M may be determined as the inverse of B. For example, if B=0.25 (¼), then M=4/1=4.0. Similarly, if B=0.5, then M=2.0. In some embodiments, the brightness level B may correspond to the standard range (SDR) maximum brightness value (1.0), and thus may determine the nominal display range. In some embodiments, when determining M, M may be optimized to be as large as possible while ensuring that precision, perceptual, and aesthetic thresholds are not exceeded. For example, at the viewer's current adaptation (especially in dark ambient conditions), it is important that the display's light leakage does not pass an objectionable perceptual threshold, and M may be optimized to be near, but below, this threshold. Further, given the precision of the rendering pipeline(s) and the ability to carry more precision via techniques such as a dithering technique, it is important that the carrying capacity is sufficient such that no perceptual banding is induced in smooth gradients, and optimizing M helps to insure sufficient carrying capacity by limiting M to a value that is supported by the pipeline(s) without exceeding precision, perceptual, and aesthetic limits. As another example, if M is set too high, then the nominal display range, the lower portion of the display space into which the standard range (0.0-1.0) or SDR content is mapped, may be reduced to the point where different luminance levels are not distinguishable under current ambient conditions and the viewer's adaptation to those conditions because they are being mapped into too few perceptual bin thresholds. Thus, M may be optimized to be as large as possible while not exceeding a perceptual bin threshold for the display panel. In addition, in some embodiments, the black level may be adapted according to current ambient conditions such that the potentially compressed signal will be visible given the viewer's current adaptation. Further, a transfer function may be applied to map content to the model of the user's adapted vision and perceptual bins.

FIG. 7C shows element 720 of FIG. 7A in more detail, according to some embodiments. The method of FIG. 7C may, for example, be performed by a rendering pipeline as illustrated in FIG. 3. As indicated at 722 of FIG. 7C, a rendering pipeline obtains a maximum rendering value M, for example from a dynamic display module as illustrated in FIGS. 2A, 2B, and 3. As indicated at 724 of FIG. 7C, the rendering pipeline may render input "raw" content received from a source (e.g., a video camera or video streaming source), mapping the luma (brightness) component into the range 0.0-M. In some embodiments, standard or SDR content may be mapped to the luma range 0.0-1.0, with the extended or HDR content mapped to the luma range 1.0-M. As indicated at 726 of FIG. 7C, the rendering pipeline may encode the HDR content (preserving the luma range 0.0-M) to generate encoded or compressed HDR content. In some embodiments, the rendering pipeline may encode the rendered content into an encoded or compressed format according to an encoding method, for example a compressed video format such as H.264/Advanced Video Coding (AVC) format, or H.265 High Efficiency Video Coding (HEVC) format. The encoded HDR content may be streamed to a display pipeline. Alternatively, the encoded content may be streamed into a memory, for example into buffer(s) in a direct memory access (DMA) memory, for access by the display pipeline.

FIG. 7D shows element 740 of FIG. 7A in more detail, according to some embodiments. The method of FIG. 7D may, for example, be performed by a display pipeline as illustrated in FIGS. 2A and 2B. As indicated at 742 of FIG. 7D, the display pipeline may decode the encoded HDR content. In some embodiments, the display pipeline receives the encoded HDR content, with the luma component rendered into the range 0.0-M by the rendering pipeline, and decodes the encoded content, preserving the dynamic range. The encoded HDR content may be received directly as a stream from a rendering pipeline, or may be read from a memory, for example from buffer(s) in a DMA memory.

As indicated at 744 of FIG. 7D, the display pipeline may map the decoded content (range 0.0-M) to the display space of the target display. In some embodiments, the display pipeline maps the decoded content (range 0.0-M) into the display space of the target display, preserving the dynamic range 0.0-M of the luma content. In some embodiments, the display pipeline may map the standard (range 0.0-1.0) portion of the decoded HDR content to the nominal display range as determined according to the current brightness level, and map the extended (range 1.0-M) portion of the decoded HDR content to the headroom above the current brightness level B. For example, if the target display is an 8-bit display, current brightness level B is 50%, and M=2.0, then standard range (0.0-1.0) or SDR content may be mapped or compressed into the lower portion of the display space as indicated by B (codes 0-127), with the extended range (1.0-2.0) or HDR content mapped into the remainder of the display space (codes 128-255). Thus, even on a standard display, rendered HDR content above the standard range (0.0-1.0) may be displayed.

In some embodiments, at least some of the functionality as described herein for rendering and displaying HDR digital image content may be implemented by one or more components or modules of a system on a chip (SOC) that may be used in devices including but not limited to multifunction devices, smartphones, pad or tablet devices, and other portable computing devices such as laptop, notebook, and netbook computers.

HDR Effects

In at least some embodiments of an HDR rendering and display system, a maximum rendering value M may be determined and provided to the rendering pipeline(s). The rendering pipeline(s) may then render and encode input content into the range 0.0-M to generate encoded HDR output. In some embodiments, the rendering pipelines(s) may render standard content into the range (0.0-1.0), and brighter or very bright content (e.g., an explosion in a scene of a video, or other bright effects) into the extended portion of the range (1.0-M). As shown in FIG. 5C, the display pipeline may decode encoded HDR content and map the standard (range 0.0-1.0) portion of the decoded HDR content to a nominal display range for the display as determined according to the current brightness level, and map the extended (range 1.0-M) portion of the decoded HDR content to the headroom above the current brightness level. Thus, if there is a bright event or effect in input content such as an explosion in a scene of a video, even though the standard video content is dimmed down to below the current brightness level on the display, the explosion is displayed above the current brightness level, and thus shows as much brighter than the standard content. Thus, even on a standard (non-HDR-enabled) display (e.g., maximum brightness=400 NITs) under at least some ambient conditions and brightness settings, very bright effects such as explosions may be displayed in a way that is perceptually impressive, for example when the viewer's perception is dim adapted. For example, if the viewer is adapted to 100 NITs, then 400 NITs is perceptually impressive. A NIT is a measurement of light in candelas per meter square.

In some embodiments, a rendering pipeline and/or a display pipeline may use the knowledge of the standard range (0.0-1.0) and extended range (1.0-M) to add effects into the extended range. For example, when processing and displaying user interface (UI) elements for display, the UI content may generally be rendered, processed, and mapped into the display space as standard range or SDR content. A rendering pipeline and/or display pipeline that processes SDR content may add effects for the UI content into the extended range (1.0-M). For example, when adding a new UI element, the new element's brightness may be temporarily increased above the 1.0 nominal value to call attention to the element. Such HDR effects for SDR content may, for example, be used to indicate or call attention to selections in lists, to highlight words or sentences in documents found by a search function, and in general in any place that an application, utility, and/or an operating system that generally provides SDR content wants to highlight or call attention to an item, element, or any other location or object in the SDR content displayed to the display panel.

Adapting HDR Rendering and Display to Ambient Conditions Using a Perceptual Model As previously noted, at a given adaptation level, there are only about $2^8$ to $2^9$ different levels of intensity that the human visual system can distinguish. In some embodiments, an HDR rendering and display system as described herein may employ methods (referred to herein as adaptive rendering methods) to detect and analyze ambient environmental conditions including but not limited to ambient lighting and backlight/brightness conditions to determine a current range for human vision according to the current conditions, and may adapt the rendering and display of content to the target display panel into that range according to the current conditions using a perceptual model. Perceptual models are further described in the section titled Perceptual models. In some embodiments, at least a portion of the adaptive rendering methods may be performed by a display pipeline as illustrated in FIGS. 2A and 2B. In some embodiments, at least a portion of the adaptive rendering methods may be performed by a rendering pipeline as illustrated in FIG. 3. In some embodiments, at least a portion of the adaptive rendering methods may be performed by a dynamic display component or module of an HDR rendering and display system as illustrated in FIGS. 2A, 2B, and 3.

In some embodiments of an HDR rendering and display system, various measurements, metrics, or characteristics may be obtained and input to a perceptual model as described in the section titled Perceptual models. For example, in some embodiments, ambient light levels as detected by one or more sensors, current pixel brightness, lookup table (LUT) state, backlight maximum brightness level, and/or current backlight percentage or level may be obtained and input to a perceptual model as described herein. From the input, the perceptual model may determine a current adaptation state or level for a viewer according to ambient viewing conditions at the target display. The adaptation state or level may be used to determine a current brightness level B for the display according to the ambient viewing conditions. The current brightness level B may be expressed as a percentage, and may correspond to the standard range (SDR) maximum brightness value (1.0). The current brightness level B may be used to determine the maximum rendering value M currently supported by the display pipeline. In some embodiments, the maximum rendering value M may be determined as the inverse of B. The maximum rendering value M may be provided to the rendering pipeline(s), and the current brightness level B may be provided to the display pipeline, for example as illustrated in FIGS. 2A through 3. The rendering pipeline(s) may then render and encode input content into the range 0.0-M to generate encoded HDR output. At the display pipeline, the encoded HDR content, rendered into the range 0.0-M by the rendering pipeline(s), may be decoded and mapped into the display space of the target display according to ambient conditions as determined from the perceptual model. In some embodiments, for at least some ambient conditions and displays, the display pipeline may map the standard (range 0.0-1.0) portion of the decoded HDR content to a nominal display range as determined according to the current brightness level B, and map the extended (range 1.0-M) portion of the decoded HDR content to the headroom above the nominal display range.

In some embodiments, the perceptual model may include display panel measurements, which are metrics that may be pre-measured for a type of display panel or may be measured for an individual display panel. The measurements may, for example, include measured light leakage from the display panel, and measured reflected ambient light off the display panel, both of which may contribute to the pedestal as illustrated in FIG. 4A. The pedestal region includes shades of gray that cannot be reached with the display due to display leakage in black as well as reflected ambient light off the display panel, and illustrates how black on the display is perceptually differently from true black in terms of vision. In some embodiments, these measurements may be used to determine how low the 1.0 nominal value (the top of the nominal display range) may be placed within the display space as illustrated in FIGS. 5A-5C while still producing visually acceptable blacks.

In some embodiments, the HDR range mapping methods provided by the HDR rendering and display system as described herein, for example as illustrated in FIGS. 5A-5C, may also be used to provide a digital dimming effect either in conjunction with or separate from providing the HDR effect of rendering values above 1.0 as illustrated in FIGS. 5B-5C. The digital dimming effect may allow displays for which the backlight/brightness, during operation, will not dim to black/off (in other words, the backlight/brightness can only be adjusted between full or maximum brightness and a brightness value greater than 0.0) to provide a dimmer or darker result than can be provided by just adjusting the backlight/brightness to its lower or minimum levels. The digital dimming effect may, for example, be achieved by setting the backlight/brightness to a known level (which may be, but is not necessarily, full or maximum brightness) and scaling or mapping the pixel values using the HDR range mapping methods provided by the HDR rendering and display system as described herein to effectively adjust the brightness level.

HDR Rendering and Display System Implementation Details

Various embodiments of an HDR rendering and display system may use various image processing algorithms and techniques including but not limited to color gamut mapping and global or local tone mapping when rendering HDR content. In some embodiments, at least a portion of the functionality of an HDR rendering and display system including but not limited to the adaptive rendering methods may be implemented using one or more Graphics Processor Units (GPUs). For example, some embodiments may implement a custom shader that may apply adjustments determined according to a perceptual model to content. In some embodiments, at least a portion of the HDR rendering and display system functionality may be implemented in or by other hardware including but not limited to custom hardware. For example, in some embodiments, one or more Image Signal Processor (ISP) color pipes may be used to apply rendering adjustments to the content.

In some embodiments of an HDR rendering and display system, a simple scale or multiplication function may be used to apply adjustments or mappings to pixel values in the rendering and/or display pipelines as described herein. In some embodiments, instead of or in addition to simple scaling functions, one or more lookup tables (LUTs) may be used to apply at least some of the rendering adjustments (e.g., pixel value mapping or scaling) to the content. In some embodiments the LUTs may be adapted to correct for particular displays or types of displays.

In some embodiments of an HDR rendering and display system, the rendering and/or display pipelines may use a global tone mapping (GTM) technique may be used in mapping content from one dynamic range to another. In a GTM technique, a global tone curve may be specified or determined for one or more frames and used in converting the content from one dynamic range to another. In some embodiments, instead of or in addition to a GTM technique, a local tone mapping (LTM) technique may be used in converting content from one dynamic range to another. In an LTM technique, an image or frame is divided into multiple regions, with a tone curve specified or determined for each region. An LTM technique may help maintain contrast, for example when compressing past the otherwise achievable range of the display device. This may, for example, be the case when display brightness is competing with ambient brightness, for example when in direct sunlight.

In some embodiments of an HDR rendering and display system, the rendering and/or display pipelines may employ dithering techniques, for example a stochastic pre-quantization dither, when or after applying any of the various pixel scaling, compression, or mapping techniques as described herein. Applying dither after mapping or scaling content may help maintain the appearance of the original, non-scaled content, and may reduce or eliminate banding or other artifacts that may result from the mapping techniques.

Perceptual Models

A color management system may control conversions between the color representations of various devices including but not limited to camera devices and display devices according to a color appearance model. Broadly defined, a color appearance model is a mathematical model that describes a way in which colors can be represented, generally using three or four values or color components. A color appearance model may define dimensions of color appearance (e.g., brightness (luminance), lightness, colorfulness, chroma, saturation, and hue). A color appearance model may also define one or more transforms or transform functions, such as a chromatic adaptation transform, which may be applied to the color components. Chromatic adaptation is generally defined as a dynamic mechanism of the human visual system that compensates for white point changes when viewing an object in different illuminations. In a color appearance model, a chromatic adaptation transform may be used to model the chromatic adaptation of the human visual system. An example color appearance model that may be used in embodiments is CIECAM02, published by the International Commission on Illumination (CIE) Technical Committee 8-01 (Color Appearance Modelling for Color Management Systems).

Conventional color management systems may map or match the source (e.g., video) intention to a measured display response, for example using gamut (color, or chroma) and gamma (tone, or luminance) mapping techniques:

Source→Measured Display

However, as noted above, the response of a display as perceived by a viewer may be different from the display's measured response. Thus, some embodiments of an HDR rendering and display system may add an additional matching step to the mapping process:

Source→Measured Display→Adapted Vision
where adapted vision is a viewer perceptual range under current ambient conditions (e.g., ambient light levels), and where the mappings (indicated by the arrows) may include transforms (e.g., chromatic adaptation transforms) of the color appearance model. Modified color management that includes this additional step in the mapping process may be referred to as a perceptual color management system. A color appearance model of a perceptual color management system may be referred to as a perceptual model.

Information that can be obtained and fed into a perceptual model of a perceptual color management system implemented in an HDR rendering and display system may include, but is not limited to, display information, for example various display characteristics and settings, and environment information including but not limited to viewer and lighting information. Some of this information may be static (e.g., display characteristics such as bit depth and dimensions), while other information may be dynamic (e.g., current display settings, backlight/brightness level, ambient light, reflected ambient light, viewer position, viewer location, etc.) This information may be collected and used to adaptively render content for display according to current ambient conditions as applied to a perceptual model. In some embodiments, a device that includes the display panel that the content is being adapted for may include one or more sensors, for example ambient light sensors, cameras, motion detectors, and so on, that may be used to collect at least some of the information used in the perceptual model.

The following describes various measurements, metrics, or characteristics that may be obtained and input to a perceptual model in an HDR rendering and display system, according to some embodiments. However, this list is not intended to be limiting:

Physical dimensions and other static characteristics of the display.

Measurements. These metrics may be pre-measured for a type of display panel or may be measured for an individual display panel. The measurements may include one or more of, but are not limited to:

The measured response of the display panel—a mapping between the input levels from the source content and the light output levels of the display panel for each color (e.g., RGB) channel.

Measured native white point of the display panel.

Measured light leakage from the display panel (contributes to the pedestal as illustrated in FIG. 4A).

Measured reflected ambient light off the display panel (contributes to the pedestal as illustrated in FIG. 4A).

Measured maximum and minimum backlight/brightness level for the display.

Ambient metrics, for example captured by sensor(s) or determined from data captured by sensor(s). A device that includes a display panel may also include one or more sensors. The sensors may include one or more of, but are not limited to, ambient light sensors, color ambient light sensors, and cameras. The light sensors and cameras may include one or more backward (towards the viewer or user) facing sensors and/or one or more forward (away from the viewer or user) facing sensors. The ambient metrics may include one or more of, but are not limited to:

Light currently hitting the display panel. This may be determined for each color channel.

Amount of light reflecting off the display. This may be determined for each color channel.

Metrics (e.g., brightness, color, etc.) of the field of view or background that the viewer/user is facing.

The brightness level that the viewer is adapted to.

Position of the viewer(s) with respect to the display panel (e.g., distance, viewing angle, etc.) In some embodiments, a user-facing camera of the device that includes the display panel may capture an image of a viewer, and the image may be analyzed to estimate a distance from the viewer to the device. For example, the image of the viewer's face may be analyzed to determine the distance based on measured distance between the viewer's eyes in the captured image, as human eyes tend to be about the same distance apart. The estimated distance to the viewer may, for example, be used to estimate the field of view that the display panel subtends.

Dynamically determined display metrics, which may include one or more of, but are not limited to:

Current backlight/brightness level/percentage of the display panel.

Current average pixel brightness (pixels actually illuminated). For example, this metric may be used in determining the brightness of the currently displayed content. This may be determined for each color channel. In some embodiments, this may be determined based on histograms of pixel values.

Providing an HDR Experience on SDR Displays

Embodiments of the HDR rendering and display system may, for example be used to provide a high dynamic range (HDR) experience to viewers on standard dynamic range (SDR) displays. To increase the dynamic range on displays may require enough bits of precision to cover the range, a transfer function that, for example, maps more bits into the dark/black range of the display space, a maximum number of NITs supported by the display, and/or a minimum number of NITs supported by the display.

Some SDR displays support a non-linear (gamma'd) input (N bits, e.g. 8, 10, 12, or 16 bits, per component of precision encoding a nominal 0.0-1.0 brightness range), and may provide a limited number of NITs) (typically 450 or more NITs) of output, with modest to high black level leakage and reflectivity. Other SDR displays provide a higher range of NITs (e.g., 1000 NITs) and can go very bright, but do not support black levels as well. Other SDR displays (e.g., OLED technology displays which do not have a backlight; instead, each pixel glows) cannot go super bright, but can go super dark (i.e., provide very good black levels). Many SDR displays typically perform well in displaying SDR content in office conditions or in dimmer environments, but typically do not perform well in brighter environments. Conventionally, SDR displays can only display HDR content if that content has been tone-mapped into SDR. Typically, an SDR display's backlight or brightness can only be dimmed to a point that renders the display too bright for comfortable nighttime (or other dark environment) use. Typically higher source bit representations are used for additional precision instead of expanding the dynamic range.

HDR displays are typically brighter than SDR displays, have greater than 8-bits per component input, and may use a non-linear transfer function that maps to brightness perception, yielding more precision than is provided by SDR displays. HDR content looks great when viewed in darker environments (the target viewing environment), but may appear incorrect in brighter conditions. SDR content appears blinding on HDR displays, thus making SDR content uncomfortable to view and incompatible with HDR content. The HDR content would appear dim in comparison to the SDR content since the HDR content's nominal level is significantly dimmer than its maximum level (the brightest HDR content is typically specular highlights). Thus, HDR displays may be modal such that they have to be manually switched to SDR mode to comfortably view SDR content.

Embodiments of the HDR rendering and display system as described herein may be used to provide an actual HDR result when viewing HDR content on conventional SDR displays without tone mapping. Using the user's brightness preferences as provided via the display's brightness control or via a modified brightness slider as described for embodiments, the system may determine if there is backlight/display headroom (i.e. if the user sets their desire for SDR content to be displayed dimmer than the maximum output of the display). The system may re-scale content such that the backlight/display is maximum, but nominal SDR content (e.g., the computer desktop) appears at their desired brightness.

Using the perceptual model, embodiments may determine where the user's vision is adapted. If adapted to the display, content may be digitally scaled and dithered so that nominal SDR content is mapped to a fraction of the brightness of the display, thus adapting the user's vision so that the actual full brightness of the display is much higher. The black point may be determined such that the scaled and dithered content will be visible to the user. This is done to avoid the content being in a zone of blacks crushed by the display, or being mapped to the same perceptual bin and rendered indistinguishable.

The user does not see (or care) about absolute brightness; rather, they care about the perception of brightness, and this is based on their adapted vision. Greater apparent brightness is available in two ways:

By employing the brightness range left when less than maximum brightness is selected (this is common when SDR content is viewed on bright displays in moderate to dim environments). In this case, brightness may be set to a value determined according to the perceptual model (e.g., to a maximum allowable setting subject to the limits of the perceptual model based on aesthetics, display panel characteristics, and/or other factors) and SDR content is scaled/mapped relative to the brightness value so that it appears the same (HDR content nominal brightness appears as desired).

In dim to dark environments where the user's vision is primarily adapted to the display (not the ambient environment), dramatically scaling content down so that the user's adaptation is only a fraction of the potential brightness of the display, which allows HDR bright details to appear dramatically bright in contrast to their adaptation.

In some embodiments, for a given target display's brightness control, for aesthetic reasons, a function is applied to the relationship between the backlight/brightness and the scaling that is not a simple multiplier. The function may prevent exceeding the maximum depending on all the criteria the perceptual model is optimizing across. In addition, to avoid hard transitions between modes, the function may provide smooth transitions between the modes. Using the function, through the entire range of brightness control (e.g., of a brightness slider), the image continues to look better even as the SDR portions are darkening.

Encoding of HDR content is extended range encoding such that 1.0 HDR represents the same brightness as 1.0 SDR (referred to as the nominal brightness level). The HDR representation may exceed 1.0 by any amount, and represents the extended dynamic range of the HDR representation. If the encoding is non-linear, then the actual linear brightness represented by the HDR encoding may greatly exceed the simple multiplication (e.g., an HDR representation that encodes (0.0, 2.0) in gamma 3 space encodes brightness values $2^3$ (eight) times the nominal brightness).

Embodiments may produce even higher dynamic range results when HDR content is displayed on displays with greater than typical SDR brightness. Conventionally, display brightness is unusable when it reaches a point that is uncomfortable to the user. By scaling the content, brighter displays may still allow the comfortable viewing of SDR content in standard office or dimmer conditions while affording even greater dynamic range (via display/backlight headroom), providing an HDR experience in brighter viewing environments, and maintaining acceptable SDR experiences into brighter (e.g., direct sunlight) environments.

The perceptual model is adaptive, and may use the same content to produce the best experience for a variety of content across many different displays, environments Embodiments may produce even higher dynamic range results when HDR content is displayed on displays with better (darker) blacks.

Embodiments may allow comfortable viewing of HDR and SDR content on displays which cannot dim sufficiently. Conventional displays, especially backlit displays, often cannot dim continuously to black. Consequently, there is a minimum brightness level that might appear unpleasantly bright to a user whose vision is dark adapted. In embodiments, the signal may be scaled and dithered to allow continuous dimming below the range typically provided to users.

Some embodiments may provide brightness control affordances to the user. Typical brightness controls provide a range of possible brightness levels that the user may continuously select among. Embodiments may re-purpose and extend conventional user brightness controls to allow users to specify their desired nominal brightness level from dimmer than dim, to HDR, to maximum brightness. In some embodiments, a brightness control UI element may be provided that indicates the HDR range, where the HDR range is exceeded, where the backlight/brightness is at a minimum level, and so on.

In some embodiments, a brightness control may be provided that may demarcate a point at which the minimum backlight/brightness levels are exceeded, and at which extra range (e.g., dimmer than dim range) may be provided by scaling. The actual backlight/brightness level no longer tracks to the brightness level set by the display brightness control, and maximum brightness is maintained, providing an HDR effect via scaling the content in the upper range where HDR is enabled.

There may be another point at which the display cannot go any brighter, but a higher perceptual level of brightness may be achieved by tone mapping the low and midrange values (i.e., the standard content) into an extended range, while compressing the brights (e.g., the HDR content) into a narrower upper portion of the range. Thus, even though the display cannot go brighter, the low and midrange content can be boosted up to make it appear brighter perceptually so that it is not lost in the reflectance of the panel. In some embodiments, the brightness control may also demarcate this point. For example, in cases where the user desires a brighter overall experience (perhaps with a relatively dim display in a bright environment), instead of scaling down standard content into the lower portion of the range the standard content may be mapped (e.g., using a combination of scaling and tone mapping) into a broader range while compressing the HDR content into the reduced upper portion of the range such that HDR nominal levels are mapped closer to the maximum level of the display, with the result of HDR aspects being lost but the SDR portion of the HDR content being visible in an adverse environment.

Some embodiments may provide a dynamic range limiting control. In some usage scenarios, the user may not want an HDR (e.g., super-bright) experience even if the source, display pipeline, display, and environment permit it. In some embodiments, a control may be provided to the user to limit the dynamic range. This may be useful in cases such as viewing a movie in bed but not wanting a dramatic experience or to bother a partner.

In some embodiments, a dynamic range expanding control may be provided (this may be, but is not necessarily, the same control as the above control that provides dynamic range limiting). This control may make low contrast content more visible, and even HDR content more exciting.

Embodiments may produce an optimal HDR or SDR content experience on displays viewed in less optimal environments. For example, conventional displays are very dim compared to direct sunlight. Embodiments may allow for continuous scaling of content based on the environment (which influences the user's adaptation).

In some embodiments, on transitions between modes when there is a new target for brightness, rather than instantly adjusting the brightness level by increasing the headroom in the display range, the headroom may be gradually increased over time (e.g., a few seconds) so that display leakage does not "pop". For example, to conserve power, when no applications are displaying HDR content, the backlight/brightness may be at a low (dim) level. There is available headroom, but for power consumption reasons the backlight/brightness is not at full. If an application requests HDR display capability, headroom for the bright (HDR) content needs to be provided, the backlight/brightness needs to be raised (e.g., to a maximum level), and content needs to be scaled/mapped into the lower and upper ranges of the display space accordingly. While this could be done instantly (e.g., in one display frame). However, to the extent there is leakage in the display panel, the black level may perceptually "pop". Thus, instead of performing to transition instantly, the transition may be stretched out over time, for example one or more seconds, thus gradually ramping the backlight/brightness level up so that there is no perceptual pop on the display panel.

In some embodiments, the perceptual model may be used to set the maximum scaling factor (M) based on one or more of the following inputs:
  The viewer's adaptation determined by the perceptual model (with temporal perceptual tracking) based on a combination of what the user sees in the environment.
  The display's contribution based on the field of view of the user:
    known size of the display.
    a sensor for determining the viewer's actual distance from the display (alternately, a typical viewing distance may be used).
  The brightness from the display (even at black). Brightness in this context may be a function of one or more of, but not limited to, the following:
    A screen-side ambient light sensor that detects light falling on the screen.
    Known measured reflectivity of display.
    Known measured display leakage.
    Maximum brightness of the display panel.
    The display leakage, based on:
      actual display brightness.
      measured display leakage (e.g., percentage of backlight/brightness).
    The actual driven pixel values.
    An ambient light sensor that detects light from what the user is seeing in the user's field of view, which may be scaled by the percentage of the user's field of view not taken up by the display.
    Known measured display characteristics based on viewing angle.

In some embodiments, global tone mapping may be used to further adapt HDR content on displays, pipelines, and adapted vision/environments where it cannot be carried. In some embodiments, global tone mapping may be applied if the user chooses to limit the range.

In some embodiments, local tone mapping may be used to provide differentiation where it would not otherwise be possible, furthering the HDR experience when viewed on displays, pipelines, and adapted vision/environments where it cannot be otherwise carried.

Embodiments may map the display into the viewer's adapted vision transfer function based on a perceptual model. This may adapt not only the black point, but also the transfer function of the display (gamma), and may provide optimal code spacing corresponding to the viewer's adapted vision and perceptual bins.

In some embodiments, nominal brightness in HDR may be based on paper white, skin tone, and/or title levels. HDR content is typically encoded in a 0.0-1.0 (or arbitrary) range. To convert such HDR content to the extended range HDR as described herein, the nominal brightness needs to be identified, and the content scaled such that nominal becomes 1.0. Nominal range may be manually or automatically determined by determining the levels of common features such as white paper, skin tones, or titles. Tone mapping may be applied in addition to scaling.

Limiting the Dynamic Range

As previously described, in some embodiments, when determining the maximum rendering value M, M may be optimized to be as large as possible to provide as wide of a dynamic range as possible while ensuring that precision, perceptual, and aesthetic thresholds are not exceeded. This section further describes aspects of determining an optimal M while limiting the dynamic range provided by M according to the thresholds.

In some embodiments, the maximum dynamic range that is expressible without objectionable discontinuities (e.g., banding, aliasing, paletteization, or quantization) when mapping content to the viewer's adaptation level in the display pipeline may be based on one or more of, but not limited to:
  display panel characteristic (e.g., maximum brightness level, transfer function, bit depth, etc.)
  source buffer precision (number of bits per channel) and transfer function;
  precision of any or all software and/or hardware components of the display pipeline, including but not limited to one or more of the following:
    precision of display driver(s);
    precision of scaler(s);
    precision of linearization component(s);
    precision of color space conversion component(s);
    precision of one or more transfer functions;
    precision of local contrast adaption component(s);
    precision of dynamic backlight control component(s);
    precision of blend unit(s);

precision carried through color space conversions (e.g., Y'CbCr carries approximately 2 bits less precision than R'G'B' of the same component depth);

the display pipeline's spatial/temporal dither (if display precision×transfer function step size is not strictly finer than that of the content and display pipeline driving it); and reconstruction filters (scalers and other blocks in the display pipeline or display) may reconstruct the dither applied earlier, and higher precision in the digital signal may be lost if adequate precision (and/or dither) is not available post-filter.

Exceeding the carrying capacity or precision of the pipeline may cause one or both of:

two codes that are less than just noticeably different in the content source space that render in the viewer's adaption to the environment and display via the display pipeline and display so as to be >JND (Just Noticeable Difference) (i.e., banding gap introduced).

two codes in the content source space that are >JND apart rendered such that they are perceived as the same in the viewer's adapted space.

Consequently, the maximum rendering value should be optimized to be as large as possible (or as large as the content requires at the time) while not exceeding the pipeline's carrying capacity or precision and no larger than the user's desired level, and one or more precision thresholds may be used to insure that it does not.

As an example of an aesthetic threshold, in some embodiments, the maximum rendering value may be limited based on the perceptual model's prediction of when the combined display leakage and re-reflection cause blacks to become objectionably non-black (i.e., a glowing effect). In some embodiments, there may be a temporal component, for example allowing greater scaling/dynamic range for instantaneous requirements (e.g., an explosion), but not for a small element for longer periods in the presence of significant black where the supposed black's glowing is objectionable.

As an example of a perceptual threshold, if the maximum rendering value is set too high, then the nominal display range, the lower portion of the display space into which the standard range (0.0-1.0) or SDR content is mapped, may be reduced to the point where different luminance levels are not distinguishable under current ambient conditions and the viewer's adaptation to those conditions because they are being mapped into too few perceptual bins as provided by the display space of the display panel. Thus, the maximum rendering value may be optimized to be as large as possible while not exceeding a perceptual bin threshold for the display panel.

Example Devices and Apparatus

FIGS. 8 through 12 show non-limiting examples of devices and apparatus in or with which embodiments or components of the various digital video or image processing and display methods and apparatus as described herein may be implemented. FIG. 8 illustrates an example SOC, and FIG. 9 illustrates an example device implementing an SOC. FIG. 10 illustrates an example computer system that may implement the methods and apparatus described herein. FIGS. 11 and 12 illustrate example multifunction devices that may implement the methods and apparatus described herein.

Example System on a Chip (SOC)

Turning now to FIG. 8, a block diagram of one embodiment of a system-on-a-chip (SOC) 8000 that may be used in embodiments. SOC 8000 is shown coupled to a memory 8800. As implied by the name, the components of the SOC 8000 may be integrated onto a single semiconductor substrate as an integrated circuit "chip." In some embodiments, the components may be implemented on two or more discrete chips in a system. However, the SOC 8000 will be used as an example herein. In the illustrated embodiment, the components of the SOC 8000 include a central processing unit (CPU) complex 8020, a display pipeline 8050, on-chip peripheral components 8040A-8040C (more briefly, "peripherals"), a memory controller (MC) 8030, and a communication fabric 8010. The components 8020, 8030, 8040A-8040C, 8050, may all be coupled to the communication fabric 8010. The memory controller 8030 may be coupled to the memory 8800 during use, and the peripheral 8040B may be coupled to an external interface 8900 during use. Similarly, the display pipeline 8050 may be coupled to a display 8052 during use. In the illustrated embodiment, the CPU complex 8020 includes one or more processors (P) 8024 and a level two (L2) cache 8022.

The peripherals 8040A-8040C may be any set of additional hardware functionality included in the SOC 8000. For example, the peripherals 8040A-8040C may include video peripherals such as an image signal processor configured to process image capture data from a camera or other image sensor, graphics processing units (GPUs), video encoder/decoders or codecs, scalers, rotators, blenders, etc. The peripherals 8040A-8040C may include audio peripherals such as microphones, speakers, interfaces to microphones and speakers, audio processors, digital signal processors, mixers, etc. The peripherals 8040A-8040C may include peripheral interface controllers for various interfaces 8900 external to the SOC 8000 (e.g., the peripheral 8040B) including interfaces such as Universal Serial Bus (USB), peripheral component interconnect (PCI) including PCI Express (PCIe), serial and parallel ports, etc. The peripherals 8040A-8040C may include networking peripherals such as media access controllers (MACs). Any set of hardware may be included.

The display pipeline 8050 may include hardware to process one or more still images and/or one or more video sequences for display on the display 8052. Generally, for each source still image or video sequence, the display pipeline 8050 may be configured to generate read memory operations to read the data representing respective portions of the frame/video sequence from the memory 8800 through the memory controller 8030.

The display pipeline 8050 may be configured to perform any type of processing on the image data (still images, video sequences, etc.). In one embodiment, the display pipeline 8050 may be configured to scale still images and to dither, scale, and/or perform color space conversion on their respective portions of frames of a video sequence. The display pipeline 8050 may be configured to composite or blend the still image frames and the video sequence frames to produce output frames for display. Display pipeline 8050 may also be referred to as a display control unit or display controller. A display control unit or controller may generally be any hardware and/or software configured to prepare output frames for display from one or more sources, such as still images and/or video sequences.

More particularly, display pipeline 8050 may be configured to retrieve respective portions of source frames from one or more source buffers 8802A-8802B stored in the memory 8800, composite frames from the source buffers, and display the resulting frames on corresponding portions of the display 8052. Source buffers 8802A-8802B are representative of any number of source frame buffers which may be stored in memory 8800. Accordingly, display pipeline 8050 may be configured to read the multiple source buffers 8802A-8802B and composite the image data to generate the output frame.

The display 8052 may be any sort of visual display device. The display 8052 may, for example, be a liquid crystal display (LCD), light emitting diode (LED), plasma, cathode ray tube (CRT), etc. The display 8052 may be integrated into a system including the SOC 8000 (e.g., a smart phone or tablet) and/or may be a separately housed device such as a computer monitor, television, or other device. Various types of source image data may be shown on display 8052. In various embodiments, the source image data may represent a video clip in a format, such as, for example, Moving Pictures Expert Group-4 Part 14 (MP4), Advanced Video Coding (H.264/AVC), or Audio Video Interleave (AVI). Alternatively, the source image data may be a series of still images, each image considered a frame, that may be displayed in timed intervals, commonly referred to as a slideshow. The images may be in a format such as Joint Photographic Experts Group (JPEG), raw image format (RAW), Graphics Interchange Format (GIF), or Portable Networks Graphics (PNG).

In some embodiments, the display 8052 may be directly connected to the SOC 8000 and may be controlled by the display pipeline 8050. That is, the display pipeline 8050 may include hardware (a "backend") that may provide various control/data signals to the display, including timing signals such as one or more clocks and/or the vertical blanking period and horizontal blanking interval controls. The clocks may include the pixel clock indicating that a pixel is being transmitted. The data signals may include color signals such as red, green, and blue, for example. The display pipeline 8050 may control the display 8052 in real-time or near real-time, providing the data indicating the pixels to be displayed as the display is displaying the image indicated by the frame. The interface to such display 8052 may be, for example, VGA, HDMI, digital video interface (DVI), a liquid crystal display (LCD) interface, a plasma interface, a cathode ray tube (CRT) interface, a DisplayPort interface, any proprietary display interface, etc.

The CPU complex 8020 may include one or more CPU processors 8024 that serve as the CPU of the SOC 8000. The CPU of the system includes the processor(s) that execute the main control software of the system, such as an operating system. Generally, software executed by the CPU during use may control the other components of the system to realize the desired functionality of the system. The processors 8024 may also execute other software, such as application programs. The application programs may provide user functionality, and may rely on the operating system for lower level device control. Accordingly, the processors 8024 may also be referred to as application processors. The CPU complex 8020 may further include other hardware such as the L2 cache 8022 and/or and interface to the other components of the system (e.g., an interface to the communication fabric 8010). Generally, a processor may include any circuitry and/or microcode configured to execute instructions defined in an instruction set architecture implemented by the processor. The instructions and data operated on by the processors in response to executing the instructions may generally be stored in the memory 8800, although certain instructions may be defined for direct processor access to peripherals as well. Processors may encompass processor cores implemented on an integrated circuit with other components as a system on a chip (SOC 8000) or other levels of integration. Processors may further encompass discrete microprocessors, processor cores and/or microprocessors integrated into multichip module implementations, processors implemented as multiple integrated circuits, etc.

The memory controller 8030 may generally include the circuitry for receiving memory operations from the other components of the SOC 8000 and for accessing the memory 8800 to complete the memory operations. The memory controller 8030 may be configured to access any type of memory 8800. For example, the memory 8800 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g., LPDDR, mDDR, etc.). The memory controller 8030 may include queues for memory operations, for ordering (and potentially reordering) the operations and presenting the operations to the memory 8800. The memory controller 8030 may further include data buffers to store write data awaiting write to memory and read data awaiting return to the source of the memory operation. In some embodiments, the memory controller 8030 may include a memory cache to store recently accessed memory data. In SOC implementations, for example, the memory cache may reduce power consumption in the SOC by avoiding re-access of data from the memory 8800 if it is expected to be accessed again soon. In some cases, the memory cache may also be referred to as a system cache, as opposed to private caches such as the L2 cache 8022 or caches in the processors 8024, which serve only certain components. Additionally, in some embodiments, a system cache need not be located within the memory controller 8030.

In an embodiment, the memory 8800 may be packaged with the SOC 8000 in a chip-on-chip or package-on-package configuration. A multichip module configuration of the SOC 8000 and the memory 8800 may be used as well. Such configurations may be relatively more secure (in terms of data observability) than transmissions to other components in the system (e.g., to the end points 16A-16B). Accordingly, protected data may reside in the memory 8800 unencrypted, whereas the protected data may be encrypted for exchange between the SOC 8000 and external endpoints.

The communication fabric 8010 may be any communication interconnect and protocol for communicating among the components of the SOC 8000. The communication fabric 8010 may be bus-based, including shared bus configurations, cross bar configurations, and hierarchical buses with bridges. The communication fabric 8010 may also be packet-based, and may be hierarchical with bridges, cross bar, point-to-point, or other interconnects.

It is noted that the number of components of the SOC 8000 (and the number of subcomponents for those shown in FIG. 8, such as within the CPU complex 8020) may vary from embodiment to embodiment. There may be more or fewer of each component/subcomponent than the number shown in FIG. 8.

FIG. 9 a block diagram of one embodiment of a system 9000 that includes at least one instance of an SOC 8000 coupled to one or more external peripherals 9020 and the external memory 8800. A power management unit (PMU) 9010 is provided which supplies the supply voltages to the SOC 8000 as well as one or more supply voltages to the memory 8800 and/or the peripherals 9020. In some embodiments, more than one instance of the SOC 8000 may be included (and more than one memory 8800 may be included as well).

The peripherals 9020 may include any desired circuitry, depending on the type of system 9000. For example, in one embodiment, the system 9000 may be a mobile device (e.g., personal digital assistant (PDA), smart phone, etc.) and the peripherals 9020 may include devices for various types of wireless communication, such as wifi, Bluetooth, cellular, global positioning system, etc. The peripherals 9020 may also include additional storage, including RAM storage, solid state storage, or disk storage. The peripherals 9020 may include user interface devices such as a display screen, including touch display screens or multitouch display screens, keyboard or other input devices, microphones, speakers, etc. In other embodiments, the system 9000 may be any type of computing system (e.g., desktop personal computer, laptop, workstation, net top etc.).

The external memory 8800 may include any type of memory. For example, the external memory 8800 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 8800 may include one or more memory modules to which the memory devices are mounted, such as single inline memory modules (SIMMs), dual inline memory modules (DIMMs), etc. Alternatively, the external memory 8800 may include one or more memory devices that are mounted on the SOC 8000 in a chip-on-chip or package-on-package implementation.

Example Computer System

FIG. 10 illustrates an example computer system 2900 that may be configured to execute any or all of the embodiments described above. In different embodiments, computer system 2900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, application server, storage device, a video recording device, a peripheral device such as a switch, modem, router, or in general any type of computing or electronic device.

Various embodiments as described herein, may be executed in one or more computer systems 2900, which may interact with various other devices. Note that any component, action, or functionality described above with respect to FIGS. 1 through 9 may be implemented on one or more computers configured as computer system 2900 of FIG. 10, according to various embodiments. In the illustrated embodiment, computer system 2900 includes one or more processors 2910 coupled to a system memory 2920 via an input/output (I/O) interface 2930. Computer system 2900 further includes a network interface 2940 coupled to I/O interface 2930, and one or more input/output devices or components 2950, such as cursor control 2960, keyboard 2970, display(s) 2980, camera(s) 2990, and sensor(s) 2992 including but not limited to light sensors and motion detectors. In some cases, it is contemplated that embodiments may be implemented using a single instance of computer system 2900, while in other embodiments multiple such systems, or multiple nodes making up computer system 2900, may be configured to host different portions or instances of embodiments. For example, in one embodiment some elements may be implemented via one or more nodes of computer system 2900 that are distinct from those nodes implementing other elements.

In various embodiments, computer system 2900 may be a uniprocessor system including one processor 2910, or a multiprocessor system including several processors 2910 (e.g., two, four, eight, or another suitable number). Processors 2910 may be any suitable processor capable of executing instructions. For example, in various embodiments processors 2910 may be general-purpose or embedded processors implementing any of a variety of instruction set architectures (ISAs), such as the x829, PowerPC, SPARC, or MIPS ISAs, or any other suitable ISA. In multiprocessor systems, each of processors 2910 may commonly, but not necessarily, implement the same ISA.

System memory 2920 may be configured to store program instructions 2922 and/or data accessible by processor 2910. In various embodiments, system memory 2920 may be implemented using any suitable memory technology, such as static random access memory (SRAM), synchronous dynamic RAM (SDRAM), nonvolatile/Flash-type memory, or any other type of memory. In the illustrated embodiment, program instructions 2922 may be configured to implement any of the functionality described herein. Additionally, memory 2920 may include any of the information or data structures described herein. In some embodiments, program instructions and/or data may be received, sent or stored upon different types of computer-accessible media or on similar media separate from system memory 2920 or computer system 2900. While computer system 2900 is described as implementing the functionality of functional blocks of previous Figures, any of the functionality described herein may be implemented via such a computer system.

In one embodiment, I/O interface 2930 may be configured to coordinate I/O traffic between processor 2910, system memory 2920, and any peripheral devices in the device, including network interface 2940 or other peripheral interfaces, such as input/output devices 2950. In some embodiments, I/O interface 2930 may perform any necessary protocol, timing or other data transformations to convert data signals from one component (e.g., system memory 2920) into a format suitable for use by another component (e.g., processor 2910). In some embodiments, I/O interface 2930 may include support for devices attached through various types of peripheral buses, such as a variant of the Peripheral Component Interconnect (PCI) bus standard or the Universal Serial Bus (USB) standard, for example. In some embodiments, the function of I/O interface 2930 may be split into two or more separate components, such as a north bridge and a south bridge, for example. Also, in some embodiments some or all of the functionality of I/O interface 2930, such as an interface to system memory 2920, may be incorporated directly into processor 2910.

Network interface 2940 may be configured to allow data to be exchanged between computer system 2900 and other devices attached to a network 2985 (e.g., carrier or agent devices) or between nodes of computer system 2900. Network 2985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2950 may, in some embodiments, include one or more display terminals, keyboards, keypads, touchpads, scanning devices, voice or optical recognition devices, or any other devices suitable for entering or accessing data by one or more computer systems 2900. Multiple input/output devices 2950 may be present in computer system 2900 or may be distributed on various nodes of computer system 2900. In some embodiments, similar input/output devices may be separate from computer system 2900 and may interact with one or more nodes of computer system 2900 through a wired or wireless connection, such as over network interface 2940.

As shown in FIG. 10, memory 2920 may include program instructions 2922, which may be processor-executable to implement any element or action described above. In one embodiment, the program instructions may implement the methods described above. In other embodiments, different elements and data may be included. Note that data may include any data or information described above.

Those skilled in the art will appreciate that computer system 2900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2900 may be transmitted to computer system 2900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Multifunction Device Examples

FIG. 11 illustrates a block diagram of a portable multifunction device in accordance with some embodiments. In some embodiments, the device is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a streaming video application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 2100 may include memory 2102 (which may include one or more computer readable storage mediums), memory controller 2122, one or more processing units (CPU's) 2120, peripherals interface 2118, RF circuitry 2108, audio circuitry 2110, speaker 2111, touch-sensitive display system 2112, microphone 2113, input/output (I/O) subsystem 2106, other input control devices 2116, and external port 2124. Device 2100 may include one or more optical sensors or cameras 2164. These components may communicate over one or more communication buses or signal lines 2103.

It should be appreciated that device 2100 is only one example of a portable multifunction device, and that device 2100 may have more or fewer components than shown, may combine two or more components, or may have a different configuration or arrangement of the components. The various components shown in FIG. 11 may be implemented in hardware, software, or a combination of hardware and software, including one or more signal processing and/or application specific integrated circuits.

Memory 2102 may include high-speed random access memory and may also include non-volatile memory, such as one or more magnetic disk storage devices, flash memory devices, or other non-volatile solid-state memory devices.

Access to memory 2102 by other components of device 2100, such as CPU 2120 and the peripherals interface 2118, may be controlled by memory controller 2122.

Peripherals interface 2118 can be used to couple input and output peripherals of the device to CPU 2120 and memory 2102. The one or more processors 2120 run or execute various software programs and/or sets of instructions stored in memory 2102 to perform various functions for device 2100 and to process data.

In some embodiments, peripherals interface 2118, CPU 2120, and memory controller 2122 may be implemented on a single chip, such as chip 2104. In some other embodiments, they may be implemented on separate chips.

RF (radio frequency) circuitry 2108 receives and sends RF signals, also called electromagnetic signals. RF circuitry 2108 converts electrical signals to/from electromagnetic signals and communicates with communications networks and other communications devices via the electromagnetic signals. RF circuitry 2108 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 2108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 2110, speaker 2111, and microphone 2113 provide an audio interface between a user and device 2100. Audio circuitry 2110 receives audio data from peripherals interface 2118, converts the audio data to an electrical signal, and transmits the electrical signal to speaker 2111. Speaker 2111 converts the electrical signal to audible sound waves. Audio circuitry 2110 also receives electrical signals converted by microphone 2113 from sound waves. Audio circuitry 2110 converts the electrical signal to audio data and transmits the audio data to peripherals interface 2118 for processing. Audio data may be retrieved from and/or transmitted to memory 2102 and/or RF circuitry 2108 by peripherals interface 2118. In some embodiments, audio circuitry 2110 also includes a headset jack. The headset jack provides an interface between audio circuitry 2110 and removable audio input/output peripherals, such as output-only headphones or a headset with both output (e.g., a headphone for one or both ears) and input (e.g., a microphone).

I/O subsystem 2106 couples input/output peripherals on device 2100, such as touch screen 2112 and other input control devices 2116, to peripherals interface 2118. I/O subsystem 2106 may include display controller 2156 and one or more input controllers 2160 for other input control devices 2116. The one or more input controllers 2160 receive/send electrical signals from/to other input control devices 2116. The other input control devices 2116 may include physical buttons (e.g., push buttons, rocker buttons, etc.), dials, slider switches, joysticks, click wheels, and so forth. In some alternative embodiments, input controller(s) 2160 may be coupled to any (or none) of the following: a keyboard, infrared port, USB port, and a pointer device such as a mouse. The one or more buttons may include an up/down button for volume control of speaker 2111 and/or microphone 2113. The one or more buttons may include a push button.

Touch-sensitive display 2112 provides an input interface and an output interface between the device and a user. Display controller 2156 receives and/or sends electrical signals from/to touch screen 2112. Touch screen 2112 displays visual output to the user. The visual output may include graphics, text, icons, video, and any combination thereof (collectively termed "graphics"). In some embodiments, some or all of the visual output may correspond to user-interface objects.

Touch screen 2112 has a touch-sensitive surface, sensor or set of sensors that accepts input from the user based on haptic and/or tactile contact. Touch screen 2112 and display controller 2156 (along with any associated modules and/or sets of instructions in memory 2102) detect contact (and any movement or breaking of the contact) on touch screen 2112 and converts the detected contact into interaction with user-interface objects (e.g., one or more soft keys, icons, web pages or images) that are displayed on touch screen 2112. In an example embodiment, a point of contact between touch screen 2112 and the user corresponds to a finger of the user.

Touch screen 2112 may use LCD (liquid crystal display) technology, LPD (light emitting polymer display) technology, or LED (light emitting diode) technology, although other display technologies may be used in other embodiments. Touch screen 2112 and display controller 2156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 2112. In an example embodiment, projected mutual capacitance sensing technology is used, such as that found in the iPhone®, iPod Touch®, and iPad® from Apple Inc. of Cupertino, Calif.

Touch screen 2112 may have a video resolution in excess of 100 dpi. In some embodiments, the touch screen has a video resolution of approximately 160 dpi. The user may make contact with touch screen 2112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 2112, device 2100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 2112 or an extension of the touch-sensitive surface formed by the touch screen.

Device 2100 also includes power system 2162 for powering the various components. Power system 2162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 2100 may also include one or more optical sensors or cameras 2164. FIG. 11 shows an optical sensor coupled to optical sensor controller 2158 in I/O subsystem 2106. Optical sensor 2164 may, for example, include charge-coupled device (CCD) or complementary metal-oxide semiconductor (CMOS) phototransistors or photosensors. Optical sensor 2164 receives light from the environment, projected through one or more lenses, and converts the light to data representing an image. In conjunction with imaging module 2143 (also called a camera module), optical sensor 2164 may capture still images and/or video sequences. In some embodiments, at least one optical sensor may be located on the back of device 2100, opposite touch screen display 2112 on the front of the device. In some embodiments, the touch screen display may be used as a viewfinder for still and/or video image acquisition. In some embodiments, at least one optical sensor may instead or also be located on the front of the device.

Device 2100 may also include one or more proximity sensors 2166. FIG. 11 shows proximity sensor 2166 coupled to peripherals interface 2118. Alternatively, proximity sensor 2166 may be coupled to input controller 2160 in I/O subsystem 2106. In some embodiments, the proximity sensor turns off and disables touch screen 2112 when the multifunction device is placed near the user's ear (e.g., when the user is making a phone call).

Device 2100 may also include one or more orientation sensors 2168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 2100. In some embodiments, the one or more orientation sensors include any combination of orientation/rotation sensors. FIG. 11 shows the one or more orientation sensors 2168 coupled to peripherals interface 2118. Alternatively, the one or more orientation sensors 2168 may be coupled to an input controller 2160 in I/O subsystem 2106. In some embodiments, information is displayed on the touch screen display in a portrait view or a landscape view based on an analysis of data received from the one or more orientation sensors.

In some embodiments, device 2100 may also include one or more other sensors (not shown) including but not limited to ambient light sensors and motion detectors. These sensors may be coupled to peripherals interface 2118 or, alternatively, may be coupled to an input controller 2160 in I/O subsystem 2106. For example, in some embodiments, device 2100 may include at least one forward-facing (away from the user) and at least one backward-facing (towards the user) light sensors that may be used to collect ambient lighting metrics from the environment of the device 2100 for use in video and image capture, processing, and display applications.

In some embodiments, the software components stored in memory 2102 include operating system 2126, communication module 2128, contact/motion module (or set of instructions) 2130, graphics module 2132, text input module 2134, Global Positioning System (GPS) module 2135, and applications 2136. Furthermore, in some embodiments memory 2102 stores device/global internal state 2157. Device/global internal state 2157 includes one or more of: active application state, indicating which applications, if any, are currently active; display state, indicating what applications, views or other information occupy various regions of touch screen display 2112; sensor state, including information obtained from the device's various sensors and input control devices 2116; and location information concerning the device's location and/or attitude.

Operating system 2126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 2128 facilitates communication with other devices over one or more external ports 2124 and also includes various software components for handling data received by RF circuitry 2108 and/or external port 2124. External port 2124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 2130 may detect contact with touch screen 2112 (in conjunction with display controller 2156) and other touch sensitive devices (e.g., a touchpad or physical click wheel). Contact/motion module 2130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 2130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 2130 and display controller 2156 detect contact on a touchpad.

Contact/motion module 2130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 2132 includes various software components for rendering and displaying graphics on touch screen 2112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 2132 stores data representing graphics to be used. Each graphic may be assigned a corresponding code. Graphics module 2132 receives, from applications etc., one or more codes specifying graphics to be displayed along with, if necessary, coordinate data and other graphic property data, and then generates screen image data to output to display controller 2156.

Text input module 2134, which may be a component of graphics module 2132, provides soft keyboards for entering text in various applications that need text input.

GPS module 2135 determines the location of the device and provides this information for use in various applications (e.g., to telephone module 2138 for use in location-based dialing, to camera module 2143 as picture/video metadata, and to applications that provide location-based services such as map/navigation applications).

Applications 2136 may include one or more of, but are not limited to, the following modules (or sets of instructions), or a subset or superset thereof:
telephone module 2138;
video conferencing module 2139;
camera module 2143 for still and/or video imaging;
image management module 2144;
browser module 2147;
search module 2151;
video and music player module 2152, which may be made up of a video player module and a music player module; and/or
online video module 2155.
one or more other modules not shown, such as a gaming module.

Examples of other applications 2136 that may be stored in memory 2102 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 2108, audio circuitry 2110, speaker 2111, microphone 2113, touch screen 2112, display controller 2156, contact module 2130, graphics module 2132, and text input module 2134, telephone module 2138 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 2108, audio circuitry 2110, speaker 2111, microphone 2113, touch screen 2112, display controller 2156, optical sensor 2164, optical sensor controller 2158, contact/motion module 2130, graphics module 2132, text input module 2134, and telephone module 2138, videoconferencing module 2139 includes executable instructions to initiate, conduct, and terminate a video conference between a user and one or more other participants in accordance with user instructions.

In conjunction with touch screen 2112, display controller 2156, optical sensor(s) 2164, optical sensor controller 2158, contact/motion module 2130, graphics module 2132, and image management module 2144, camera module 2143 includes executable instructions to capture still images or video (including a video stream) and store them into memory 2102, modify characteristics of a still image or video, or delete a still image or video from memory 2102.

In conjunction with touch screen 2112, display controller 2156, contact/motion module 2130, graphics module 2132, text input module 2134, and camera module 2143, image management module 2144 includes executable instructions to arrange, modify (e.g., edit), or otherwise manipulate, label, delete, present (e.g., in a digital slide show or album), and store still and/or video images.

In conjunction with RF circuitry 2108, touch screen 2112, display system controller 2156, contact/motion module 2130, graphics module 2132, and text input module 2134, browser module 2147 includes executable instructions to browse the Internet in accordance with user instructions, including searching, linking to, receiving, and displaying web pages or portions thereof, as well as attachments and other files linked to web pages.

In conjunction with touch screen 2112, display system controller 2156, contact/motion module 2130, graphics module 2132, and text input module 2134, search module 2151 includes executable instructions to search for text, music, sound, image, video, and/or other files in memory 2102 that match one or more search criteria (e.g., one or more user-specified search terms) in accordance with user instructions.

In conjunction with touch screen 2112, display system controller 2156, contact/motion module 2130, graphics module 2132, audio circuitry 2110, speaker 2111, RF circuitry 2108, and browser module 2147, video and music player module 2152 includes executable instructions that allow the user to download and play back recorded music and other sound files stored in one or more file formats, such as MP3 or AAC files, and executable instructions to display, present or otherwise play back videos (e.g., on touch screen 2112 or on an external, connected display via external port 2124). In some embodiments, device 2100 may include the functionality of an MP3 player, such as an iPod (trademark of Apple Inc.).

In conjunction with touch screen 2112, display system controller 2156, contact/motion module 2130, graphics module 2132, audio circuitry 2110, speaker 2111, RF circuitry 2108, text input module 2134, and browser module 2147, online video module 2155 includes instructions that allow the user to access, browse, receive (e.g., by streaming and/or download), play back (e.g., on the touch screen or on an external, connected display via external port 2124), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 2102 may store a subset of the modules and data structures identified above. Furthermore, memory 2102 may store additional modules and data structures not described above.

In some embodiments, device 2100 is a device where operation of a predefined set of functions on the device is performed exclusively through a touch screen and/or a touchpad. By using a touch screen and/or a touchpad as the primary input control device for operation of device 2100, the number of physical input control devices (such as push buttons, dials, and the like) on device 2100 may be reduced.

The predefined set of functions that may be performed exclusively through a touch screen and/or a touchpad include navigation between user interfaces. In some embodiments, the touchpad, when touched by the user, navigates device 2100 to a main, home, or root menu from any user interface that may be displayed on device 2100. In such embodiments, the touchpad may be referred to as a "menu button." In some other embodiments, the menu button may be a physical push button or other physical input control device instead of a touchpad.

FIG. 12 illustrates a portable multifunction device 2100 having a touch screen 2112 in accordance with some embodiments. The touch screen may display one or more graphics within user interface (UI) 2200. In at least some embodiments of a device 2100, a user may select one or more of the graphics by making a gesture on the graphics, for example, with one or more fingers 2202 (not drawn necessarily drawn to scale in the figure) or one or more styluses 2203 (not necessarily drawn to scale in the figure).

Device 2100 may also include one or more physical buttons, such as a "home" or menu button 2204. As described previously, menu button 2204 may be used to navigate to any application 2136 in a set of applications that may be executed on device 2100. Alternatively, in some embodiments, the menu button is may be implemented as a soft key in a GUI displayed on touch screen 2112.

In one some embodiments, device 2100 includes touch screen 2112, home or menu button 2204, push button 2206 for powering the device on/off and locking the device, volume adjustment button(s) 2208, Subscriber Identity Module (SIM) card slot 2210, head set jack 2212, and docking/charging external port 2124. Push button 2206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 2100 also may accept verbal input for activation or deactivation of some functions through microphone 2113.

Device 2100 may also include one or more cameras 2164. A camera 2164 may, for example, include charge-coupled device (CCD) or complementary metal-oxide semiconductor (CMOS) phototransistors or photosensors. A camera 2164 receives light from the environment, projected through one or more lenses, and converts the light to data representing an image or video frame. In some embodiments, at least one camera 2164 may be located on the back of device 2100, opposite touch screen display 2112 on the front of the device. In some embodiments, at least one camera 2164 may instead or also located on the front of the device with the touch screen display 2112, for example so that the user's image may be obtained for videoconferencing while the user views the other video conference participants on the touch screen display 2112. In some embodiments, at least one camera 2164 may be located on the front of the device 2100, and at least one camera 2164 may be located on the back of the device 2100. In some embodiments, the touch screen display 2112 may be used as a viewfinder and/or user interface for still image and/or video sequence acquisition applications.

Device 2100 may include video and image processing hardware and/or software, including but not limited to video encoding and/or decoding components, codecs, modules, or pipelines, that may be used to capture, process, convert, compress, decompress, store, modify, transmit, display, and otherwise manage and manipulate still images and/or video frames or video sequences captured via camera 2164 or otherwise acquired (e.g., via a network interface). In some embodiments, device 2100 may also include one or more light or other sensors that may be used to collect ambient lighting or other metrics from the environment of the device 2100 for use in video and image capture, processing, and display.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    a display panel with a display space defined by bit depth of the display panel, the display space comprising N codes for representing pixel values; and
    one or more processors configured to implement:
        a rendering pipeline configured to render received digital image content according to a maximum rendering value M to generate high dynamic range (HDR) content in a dynamic range of (0.0-M); and a display pipeline configured to:
obtain the rendered HDR content;
map the rendered HDR content into the display space of the display panel according to a brightness level B that defines a lower portion (codes 0 to n) and an upper portion (codes n to (N−1)) of the display space;
wherein, to map the rendered HDR content into the display space of the display panel, the display pipeline is configured to:
map a first portion of the rendered HDR content in a standard range (0.0-1.0) into codes in the lower portion of the display space; and
map a second portion of the rendered HDR content in an extended range (1.0-M) into codes in the upper portion of the display space; and
output the mapped HDR content to the display panel for display.

2. The system as recited in claim 1, wherein the one or more processors are further configured to implement a dynamic display module that iteratively performs:
determine a current brightness level B according to one or more of an ambient lighting level or a brightness control setting;
determine a current maximum rendering value M according to B;
provide the current maximum rendering value M to the rendering pipeline, wherein said rendering is adjusted according to the current maximum rendering value M; and
provide the current brightness level B to the display pipeline, wherein said mapping is adjusted according to the current brightness level B.

3. The system as recited in claim 2, further comprising one or more sensors configured to detect one or more environmental conditions of the display panel including the ambient lighting level.

4. The system as recited in claim 2, wherein the brightness control setting is determined according to input from a brightness control user interface element that allows brightness to be set below a minimum brightness level of a display brightness control of the display panel.

5. The system as recited in claim 1, wherein the display pipeline is further configured to:
receive standard dynamic range (SDR) content from an SDR content source; and
composite or blend the SDR content with the standard range (0.0-1.0) portion of the HDR content in the codes in the lower portion of the display space.

6. The system as recited in claim 5, wherein the display panel comprises a display backlight, and wherein the display pipeline is further configured to:
dynamically adjust brightness level of the backlight up or down according one or more of an ambient lighting level or a brightness control setting; and
adjust at least some pixel values of the HDR content according to the brightness level of the backlight to maintain apparent brightness of the HDR content at different backlight levels, wherein pixel values of the SDR content that is composited or blended with the HDR content are not adjusted.

7. The system as recited in claim 1,
wherein the rendering pipeline is further configured to encode the rendered HDR content according to an encoding format to generate encoded HDR content; and
wherein the display pipeline is further configured to decode the encoded HDR content prior to said mapping.

8. A method, comprising:
obtaining, by a display pipeline implemented on a device, high dynamic range (HDR) content rendered in a dynamic range of (0.0-M) by one or more rendering pipelines, where M is a maximum rendering value;
mapping, by the display pipeline, the rendered HDR content obtained from the one or more rendering pipelines into a display space of a display panel according to a brightness level B that defines a lower portion (codes 0 to n) and an upper portion (codes n to (N−1)) of the display space, wherein the display space is defined by bit depth of the display panel and comprises N codes for representing pixel values, wherein said mapping comprises:
mapping a first portion of the rendered HDR content in a standard range (0.0-1.0) into codes in the lower portion of the display space; and
mapping a second portion of the rendered HDR content in an extended range (1.0-M) into codes in the upper portion of the display space; and
providing the mapped HDR content to the display panel for display.

9. The method as recited in claim 8, further comprising iteratively performing:
determining a current brightness level B according to one or more of an ambient lighting level or a brightness control setting;
determining a current maximum rendering value M according to B;
providing the current maximum rendering value M to the one or more rendering pipelines, wherein the one or more rendering pipelines adjust rendering according to the current maximum rendering value M; and
providing the current brightness level B to the display pipeline, wherein said mapping is adjusted according to the current brightness level B.

10. The method as recited in claim 8, further comprising:
determining a model of viewer perceptual range under current ambient conditions of the display panel according to a perceptual model, wherein the perceptual model determines the model of viewer perceptual range according to inputs including one or more of ambient lighting conditions, display panel characteristics, or display panel settings; and
determining the brightness level B, the lower portion and the upper portion of the display space, and the maximum rendering value M according to the model of viewer perceptual range.

11. The method as recited in claim 10, wherein said determining the maximum rendering value M comprises determining a maximum value for M that does not exceed one or more thresholds according to the perceptual model.

12. The method as recited in claim 8, further comprising:
maintaining a backlight brightness setting of the display panel at a level at or near maximum brightness for the backlight; and
adjusting the brightness level B to provide a digital dimming effect on the display panel.

13. The method as recited in claim 8, further comprising determining the brightness level B, the lower portion and an upper portion of the display space, and the maximum rendering value M at least in part according to measured light leakage from the display panel and measured reflected ambient light off the display panel.

14. The method as recited in claim 8, further comprising:
receiving, by the display pipeline, standard dynamic range (SDR) content from an SDR content source; and
compositing or blending the SDR content with the standard range (0.0-1.0) portion of the HDR content in the codes in the lower portion of the display space.

15. The method as recited in claim 14, further comprising:
receiving highlight HDR content in the SDR content; and
compositing or blending the highlight HDR content in the codes in the upper portion of the display space to highlight portions of the SDR content on the display panel.

16. The method as recited in claim 14, further comprising:
dynamically adjusting brightness level of a backlight of the display up or down according one or more of an ambient lighting level or a brightness control setting; and
adjusting at least some pixel values of the HDR content according to the brightness level of the backlight to maintain apparent brightness of the HDR content at different backlight levels, wherein pixel values of the SDR content that is composited or blended with the HDR content are not adjusted.

17. An apparatus, comprising:
one or more processors configured to implement:
an encoder configured to render input digital image content according to a maximum rendering value M to generate high dynamic range (HDR) content in a dynamic range of (0.0-M) and encode the rendered HDR content to generate encoded HDR content; and
a decoder configured to:
decode encoded HDR content to generate HDR content in the dynamic range (0.0-M);
map the HDR content into a display space of a display panel according to a brightness level B that defines a lower portion (codes 0 to n) and an upper portion (codes n to (N−1)) of the display space, wherein the display space is defined by bit depth of the display panel and comprises N codes for representing pixel values;
wherein, to map the rendered HDR content into the display space of the display panel, the display pipeline is configured to:
map a first portion of the rendered HDR content in a standard range (0.0-1.0) into codes in the lower portion of the display space; and
map a second portion of the rendered HDR content in an extended range (1.0-M) into codes in the upper portion of the display space; and
output the mapped HDR content to the display panel for display.

18. The apparatus as recited in claim 17, wherein the one or more processors are further configured to implement a dynamic display module that iteratively performs:
determine a current brightness level B according to one or more of an ambient lighting level or a brightness control setting;
determine a current maximum rendering value M according to B, wherein B is expressed as a percentage, and wherein M is determined as an inverse of B;
provide the current maximum rendering value M to the encoder, wherein said rendering is adjusted according to the current maximum rendering value M; and
provide the current brightness level B to the decoder, wherein said mapping is adjusted according to the current brightness level B.

19. The apparatus as recited in claim 17, wherein the decoder is further configured to:
receive standard dynamic range (SDR) content;
receive highlight HDR content;
composite or blend the SDR content with the standard range (0.0-1.0) portion of the HDR content in the codes in the lower portion of the display space; and
composite or blend the highlight HDR content in the codes in the upper portion of the display space to highlight portions of the SDR content on the display panel.

20. The apparatus as recited in claim 17, wherein the decoder is further configured to:
dynamically adjust brightness level of a backlight of the display up or down according one or more of an ambient lighting level or a brightness control setting; and
adjust at least some pixel values of the HDR content according to the brightness level of the backlight to maintain apparent brightness of the HDR content at different backlight levels, wherein pixel values of the SDR content that is composited or blended with the HDR content are not adjusted.

* * * * *